(12) United States Patent
Papp et al.

(10) Patent No.: US 10,048,567 B2
(45) Date of Patent: Aug. 14, 2018

(54) ELECTRONIC LIGHT SYNTHESIZER AND PROCESS FOR ELECTRONICALLY SYNTHESIZING LIGHT

(71) Applicant: The United States of America, as represented by the Secretary of Commerce, Washington, DC (US)

(72) Inventors: Scott Papp, Boulder, CO (US); Scott Diddams, Louisville, CO (US); Katja Beha, Munich (DE); Daniel Cole, Boulder, CO (US)

(73) Assignee: THE UNITED STATES OF AMERICA, AS REPRESENTED BY THE SECRETARY OF COMMERCE, Washington, DC (US)

( * ) Notice: Subject to any disclaimer, the term of this patent is extended or adjusted under 35 U.S.C. 154(b) by 0 days.

(21) Appl. No.: 15/463,643

(22) Filed: Mar. 20, 2017

(65) Prior Publication Data

US 2017/0277017 A1     Sep. 28, 2017

Related U.S. Application Data

(60) Provisional application No. 62/311,671, filed on Mar. 22, 2016.

(51) Int. Cl.
  *G02F 1/35*    (2006.01)
  *G02F 1/365*   (2006.01)
  *G02F 1/37*    (2006.01)

(52) U.S. Cl.
  CPC ........... *G02F 1/3501* (2013.01); *G02F 1/365* (2013.01); *G02F 1/37* (2013.01); *G02F 2001/3507* (2013.01); *G02F 2001/3528* (2013.01)

(58) Field of Classification Search
  CPC .......... G02F 1/3501; G02F 1/365; G02F 1/37; G02F 2001/3507; G02F 2001/3528
  See application file for complete search history.

(56) References Cited

U.S. PATENT DOCUMENTS

| 9,244,332 B1 * | 1/2016 | Calendron ............... G02F 1/39 |
| 2012/0133931 A1 * | 5/2012 | Fermann .................. G01J 3/10 356/300 |

OTHER PUBLICATIONS

Wu, R., et al., Generation of very flat optical frequency combs from continuous-wave lasers using cascaded intensity and phase modulators driven by tailored radio frequency waveforms, Optics Letters, 2010, 3234-3236, vol. 35, No. 19.

(Continued)

*Primary Examiner* — Daniel Petkovsek
(74) *Attorney, Agent, or Firm* — Office of Chief Counsel for National Institute of Standards and Technology

(57) ABSTRACT

An electronic light synthesizer electronically synthesizes supercontinuum light and includes: a microwave modulator that: receives a continuous wave light including an optical frequency; modulates the continuous wave light at a microwave repetition frequency; and produces a frequency comb modulated at the microwave repetition frequency; a self-phase modulator that: receives the frequency comb; spectrally broadens an optical wavelength range of the frequency comb; and produces broadened light modulated at the microwave repetition frequency; an optical filter that: receives the broadened light from the self-phase modulator; and optically filters electronic noise in the broadened light; and a supercontinuum generator that: receives the broadened light from the optical filter; spectrally broadens the optical wavelength range of the broadened light; and produces supercontinuum light modulated at the microwave repetition frequency.

23 Claims, 21 Drawing Sheets

(56) References Cited

OTHER PUBLICATIONS

Supradeepa, V.R., et al., Bandwith scaling and spectral flatness enhancement of optical frequency combs from phase-modulated continuous-wave lasers using cascaded four-wave mixing, Optics Letter, 2012, 3066-3068, vol. 37 No.15.

Kobayashi, T., et al., Optical pulse compression using high-frenquency electroopic phase modulation, IEEE Journal of Quantum Electronics, 1988, 382-387, vol. 24 No. 2.

Kourogi, K., et al., Wide-span optical frequency comb generator for accurate optical frequency difference measurement, IEEE Journal of Quantum Electronics, 1993, 2693-2701, vol. 29 No. 10.

Kobayahsi, T., et al., High-repetition-rate optical pulse generator using a Fabry-Perot electro-optic modulator, Applied Physics Letters, 1972, 341-343, vol. 21 No. 8.

Jones, D., et al., Carrier-envelop phase control of femtosecond mode-locked lasers and direct optical frequency synthesis, Science, 2000, 635-639, vol. 288.

Cole, D.C., et al., Octave-spanning supercontinuum generation via microwave frequency multiplication, Journal of Physics: Conference Series, 2016, 012035, 723.

Ishuzawa, A., et al., Phase-noise characteristics of a 25-GHz-spaced optical frequency comb based on a phase-and-intensity-modulated laser, Optics Express, 2013, 29186-29194, vol. 21 No. 24.

Sakamoto, T., et al., Asymptotic formalism for ultraflat optical frequency comb generation using a Mach-Zehnder modulator, Optics Letter, 2007, 1515-1517, vol. 32 No. 11.

Morohashi, I., et al., Widely repetition-tunable 200 fs pulse source using a Mach-Zehnder-modulator-based flat comb generator and dispersion-flattened dispersion-decreasing fiber, Optics Letters, 2008, 1192-1194, vol. 33 No. 11.

Ishuzawa, A., et al., Octave-spanning frequency comb generated by 250 fs pulse train emitted from 25 GHz externally phase-modulated laser diode for carrier-envelope-offset-locking, Electronics Letters, 2010, vol. 46 No. 19.

\* cited by examiner ific Research. The Government has certain rights in the invention.

ELECTRONIC LIGHT SYNTHESIZER AND PROCESS FOR ELECTRONICALLY SYNTHESIZING LIGHT

CROSS REFERENCE TO RELATED APPLICATIONS

This application claims the benefit of U.S. Provisional Patent Application Ser. Nos. 62/311,671, filed Mar. 22, 2016, the disclosure of which is incorporated herein by reference in its entirety.

STATEMENT REGARDING FEDERALLY SPONSORED RESEARCH

This invention was made with United States Government support from the National Institute of Standards and Technology. The Government has certain rights in the invention.

BRIEF DESCRIPTION

Disclosed is an electronic light synthesizer to electronically synthesize supercontinuum light, the electronic light synthesizer comprising: a microwave modulator that: receives a continuous wave light comprising an optical frequency; modulates the continuous wave light at a microwave repetition frequency; and produces a frequency comb comprising the optical frequency and modulated at the microwave repetition frequency; a self-phase modulator in optical communication with the microwave modulator and that: receives the frequency comb from the microwave modulator; spectrally broadens an optical wavelength range of the frequency comb; and produces broadened light comprising the optical frequency and modulated at the microwave repetition frequency; an optical filter in optical communication with the self-phase modulator and that: receives the broadened light from the self-phase modulator; and optically filters electronic noise in the broadened light; and a supercontinuum generator in optical communication with the optical filter and that: receives the broadened light from the optical filter; spectrally broadens the optical wavelength range of the broadened light; and produces supercontinuum light comprising the optical frequency and modulated at the microwave repetition frequency.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
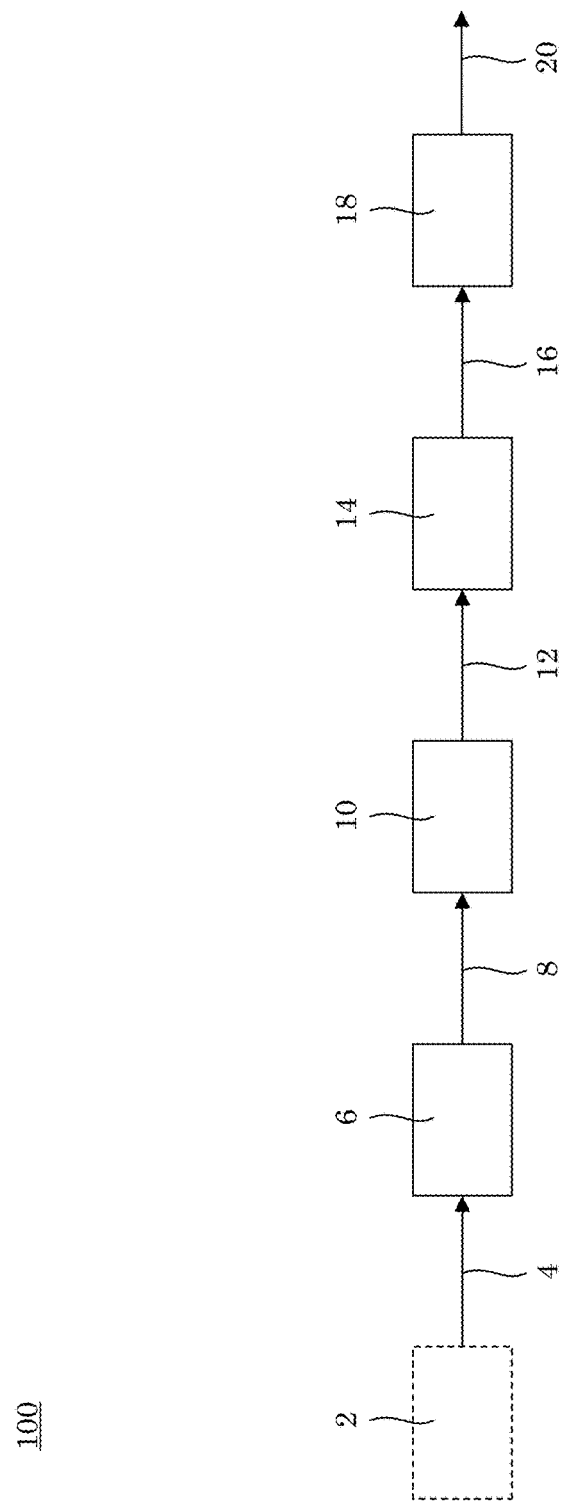
FIG. 1 shows an electronic light synthesizer.

A detailed description of one or more embodiments is presented herein by way of exemplification and not limitation.

It has been discovered that an electronic light synthesizer herein provides bidirectional frequency conversion between microwave and optical domains using electro-optics. Advances in communications, time keeping, and quantum sensing use coherent interoperation of light wave and microwave signals. The electronic light synthesizer connects these domains, separated by a factor of 10,000 in frequency in an absence of an ultrafast mode locked laser. Moreover, the electronic light synthesizer produces a frequency comb via electro-optic modulation (EOM) deterministically by subjecting continuous wave light to microwave-rate oscillations at a microwave repetition frequency. Advantageously, the electronic light synthesizer electro-optically generates supercontinuum light that can have, e.g., a 160 THz bandwidth. Beneficially, the electronic light synthesizer can include a f-2f self-referencing interferometer for self-referencing. Coherence of the supercontinuum light is achieved through optical filtering of electronic noise in broadened light en route to generation of the supercontinuum light. Mode frequencies of the supercontinuum light can be directly derived from a microwave modulator, wherein the supercontinuum light has less than $5 \times 10^{-14}$ fractional accuracy and stability. Unexpectedly, the electronic light synthesizer provides tunable combs with wide mode spacing in an absence of mode locking.

The electronic light synthesizer produces supercontinuum light that is an optical frequency comb and provides a phase-coherent link between optical and microwave frequencies through self-referencing. Further, the electronic light synthesizer can be used for measurement of optical clocks, precise calibration for optical spectroscopy, molecular identification, and coherent imaging, control of quantum systems, carrier-phase control in ultrafast science, photonic generation of microwave signals, and the like. As a self-referenced frequency comb, the supercontinuum light is produced by the electronic light synthesizer in an absence of ultrafast mode locking and overcomes a limitation of conventional mode locked-laser based combs that operate at fixed pulse repetition rate that is less than 1 gigahertz (GHz) and fixed by platform geometry. The electronic light synthesizer can be used as an optical comb source in coherent light wave communications, multiheterodyne optical detection, optical waveform synthesis, frequency calibration, searches for exoplanets and the like, wherein coincidence of wide tunability and a pulse rate of tens of GHz or greater are typical.

Before availability of mode locked-laser frequency combs, comb generation was performed with electro-optic modulation of continuous wave (CW) light. In such an EOM comb, the frequency of each comb mode (counted n from the CW laser) was $v_n = v_p + n\ f_{eo}$ and arose from the optical frequency of a CW-laser $v_p$ and frequency multiplication of microwave repetition frequency $f_{eo}$ of microwave modulation.

It is contemplated that the electronic light synthesizer electronically synthesizes light by overcoming a low spectral-broadening efficiency associated with narrow EOM-comb bandwidth and microwave repetition rates as well as overcoming full conversion of electronic noise to the optical comb that progressively degrades as $n^2$ the first-order optical coherence of the comb lines. In an embodiment, the electronic light synthesizer multiplies the microwave repetition frequency from a 10 GHz microwave modulator and produces an effective optical frequency reference for a 193 THz CW laser at the center of the EOM comb. According to an embodiment, frequency multiplication occurs with linear EOM-comb generation and nonlinear-fiber spectral broadening. An optical filter (e.g., a cavity) reduces fundamental electro-optic noise of broadened light in the electronic light synthesizer to preserve coherence in the supercontinuum light.

The electronic light synthesizer electronically synthesizes light by subjecting a continuous wave (CW) light to a microwave frequency modulation. In an embodiment, with reference to FIG. 1, electronic light synthesizer 100 includes microwave modulator 6 that: receives continuous wave light 4 that includes an optical frequency, modulates continuous wave light 4 at a microwave repetition frequency, and produces frequency comb 8 including the optical frequency and modulated at the microwave repetition frequency; self-phase modulator 10 in optical communication with microwave modulator 6 and that: receives frequency comb 8 from microwave modulator 6, spectrally broadens an optical wavelength range of frequency comb 8, and produces broadened light 12 including the optical frequency and modulated at the microwave repetition frequency; optical filter 14 in optical communication with self-phase modulator 10 and that: receives broadened light 12 from self-phase modulator 10, and optically filters electronic noise in broadened light 12; and supercontinuum generator 18 in optical communication with optical filter 14 and that: receives broadened light 16 from optical filter 14, spectrally broadens the optical wavelength range of broadened light 16, and produces supercontinuum light 20 including the optical frequency and modulated at the microwave repetition frequency.

Figure 2:
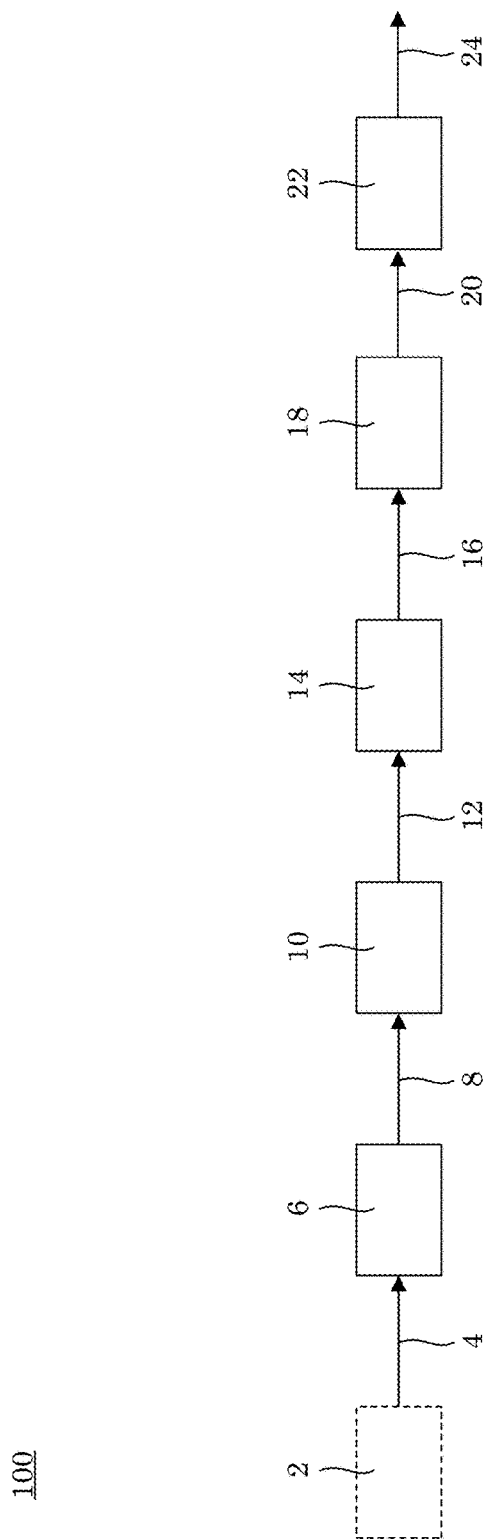
FIG. 2 shows an electronic light synthesizer.

In an embodiment, with reference to FIG. 2, electronic light synthesizer 100 includes self-referencing interferometer 22 in optical communication with supercontinuum generator 18 and that receives supercontinuum light 20 from supercontinuum generator 18 and produces interference light 24 including primary optical frequency f1 and doubled optical frequency f2 from supercontinuum light 20.

Figure 3:
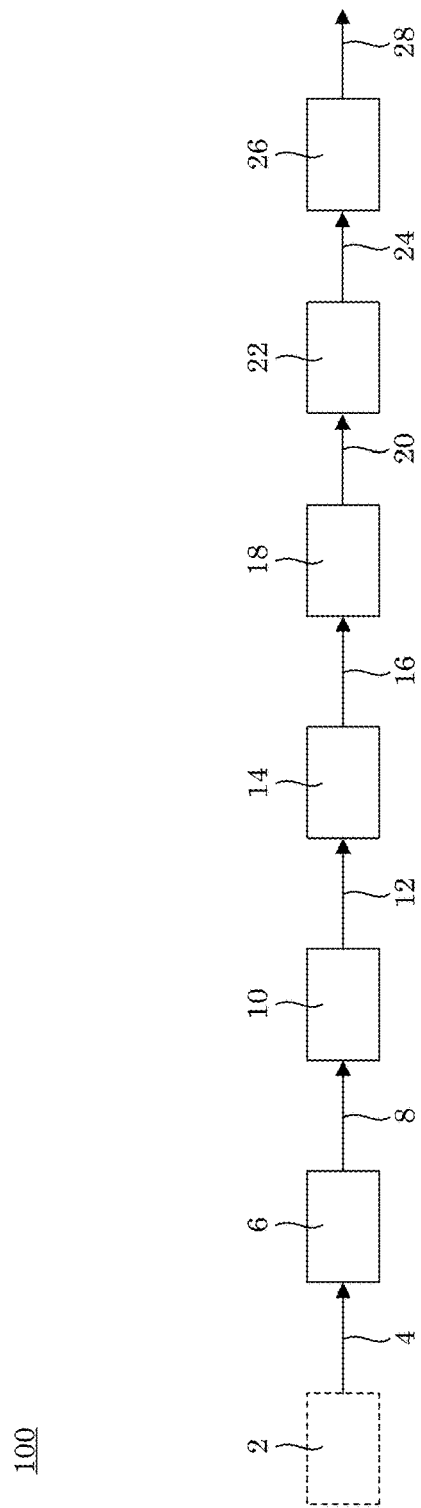
FIG. 3 shows an electronic light synthesizer.

In an embodiment, with reference to FIG. 3, electronic light synthesizer 100 includes optical detector 26 in optical communication with self-referencing interferometer 22 and that receives interference light 24 from self-referencing interferometer 22 and produces carrier-envelope offset frequency fceo from an optical heterodyne beat obtained from primary optical frequency f1 and doubled optical frequency f2.

Figure 4:
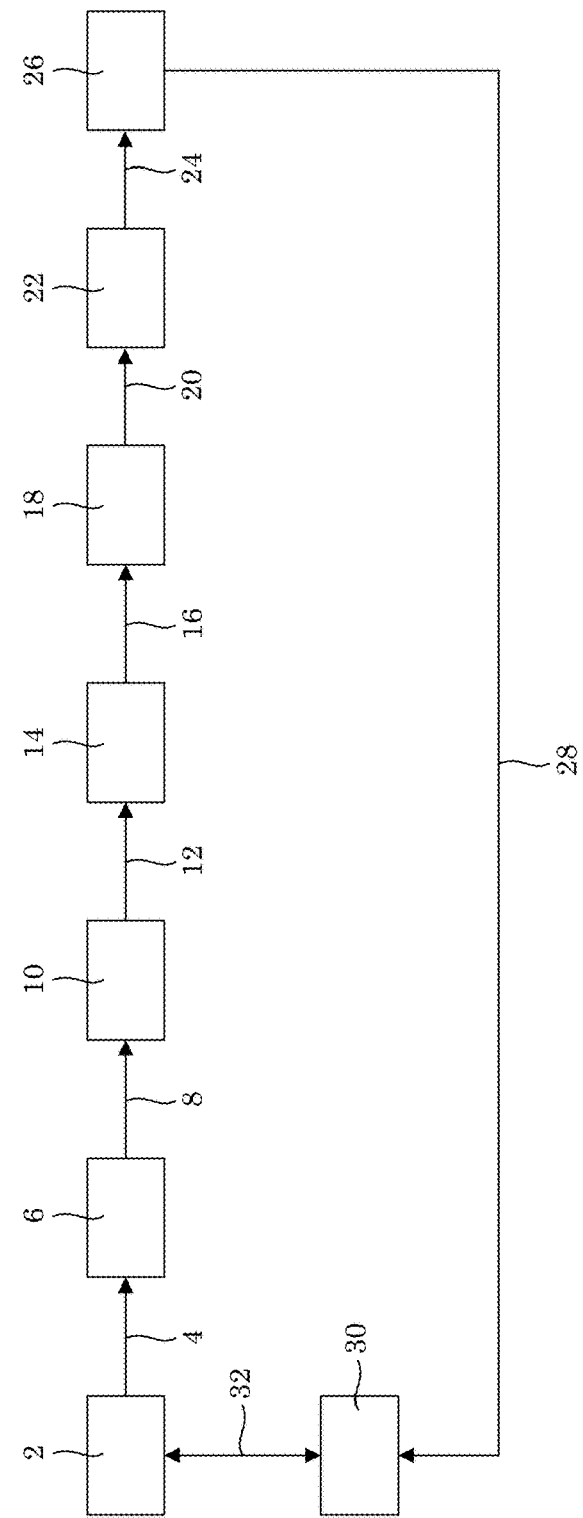
FIG. 4 shows an electronic light synthesizer.

In an embodiment, with reference to FIG. 4, electronic light synthesizer 100 includes continuous wave light source 2 in optical communication with microwave modulator 6 and that provides continuous wave light 4 to microwave modulator 6.

In an embodiment, with reference to FIG. 4, electronic light synthesizer 100 includes reference cavity 30 in optical communication with continuous wave light source 2 and in electrical communication with optical detector 26 and that receives carrier-envelope offset frequency fceo from optical detector 26 and controls continuous wave light source 2, wherein the optical frequency of continuous wave light 4 is stabilized by continuous wave light source 2 based on carrier-envelope offset frequency fceo at reference cavity 30.

Figure 5:
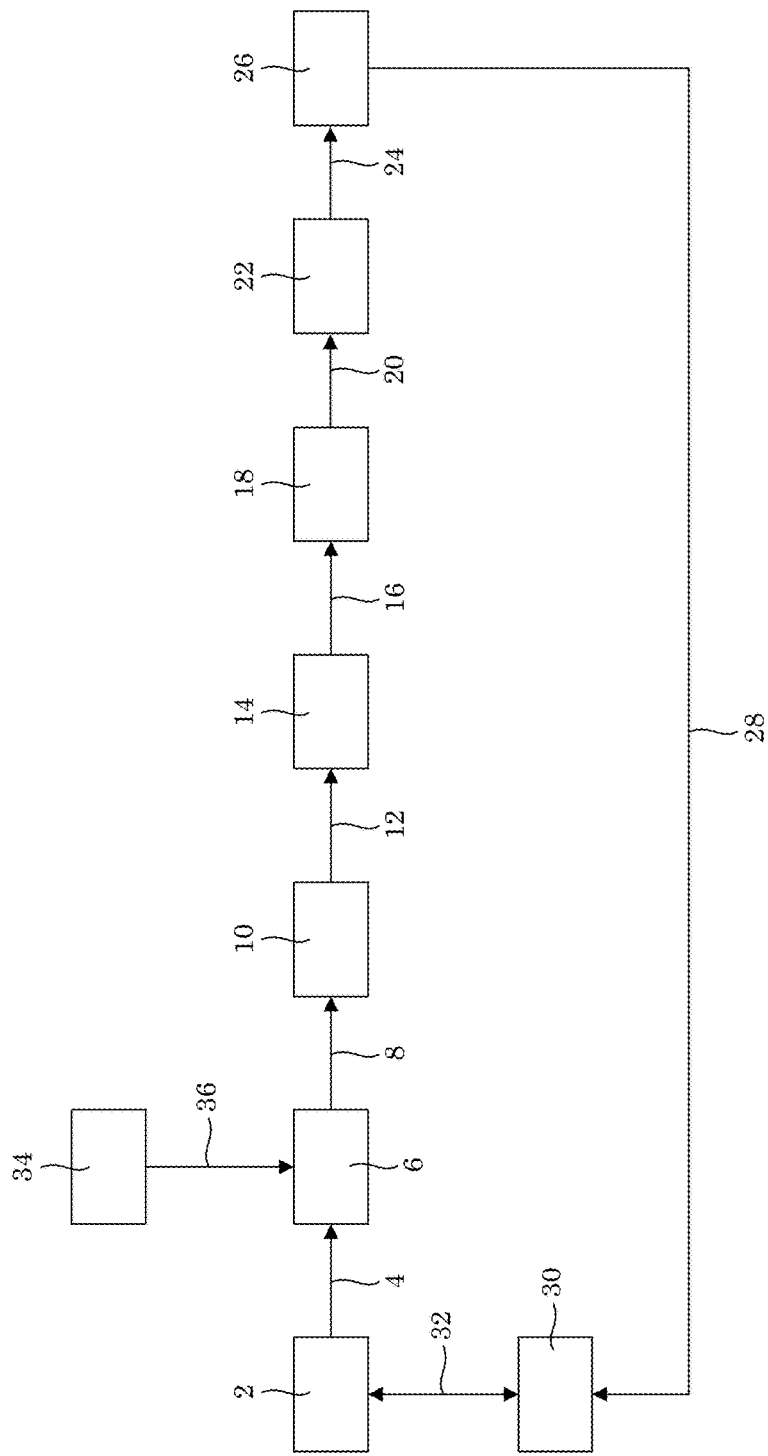
FIG. 5 shows an electronic light synthesizer.

In an embodiment, with reference to FIG. 5, electronic light synthesizer 100 includes microwave frequency source 34 in communication with microwave modulator 6 and provides microwave repetition frequency 36 to microwave modulator 6.

Figure 6:
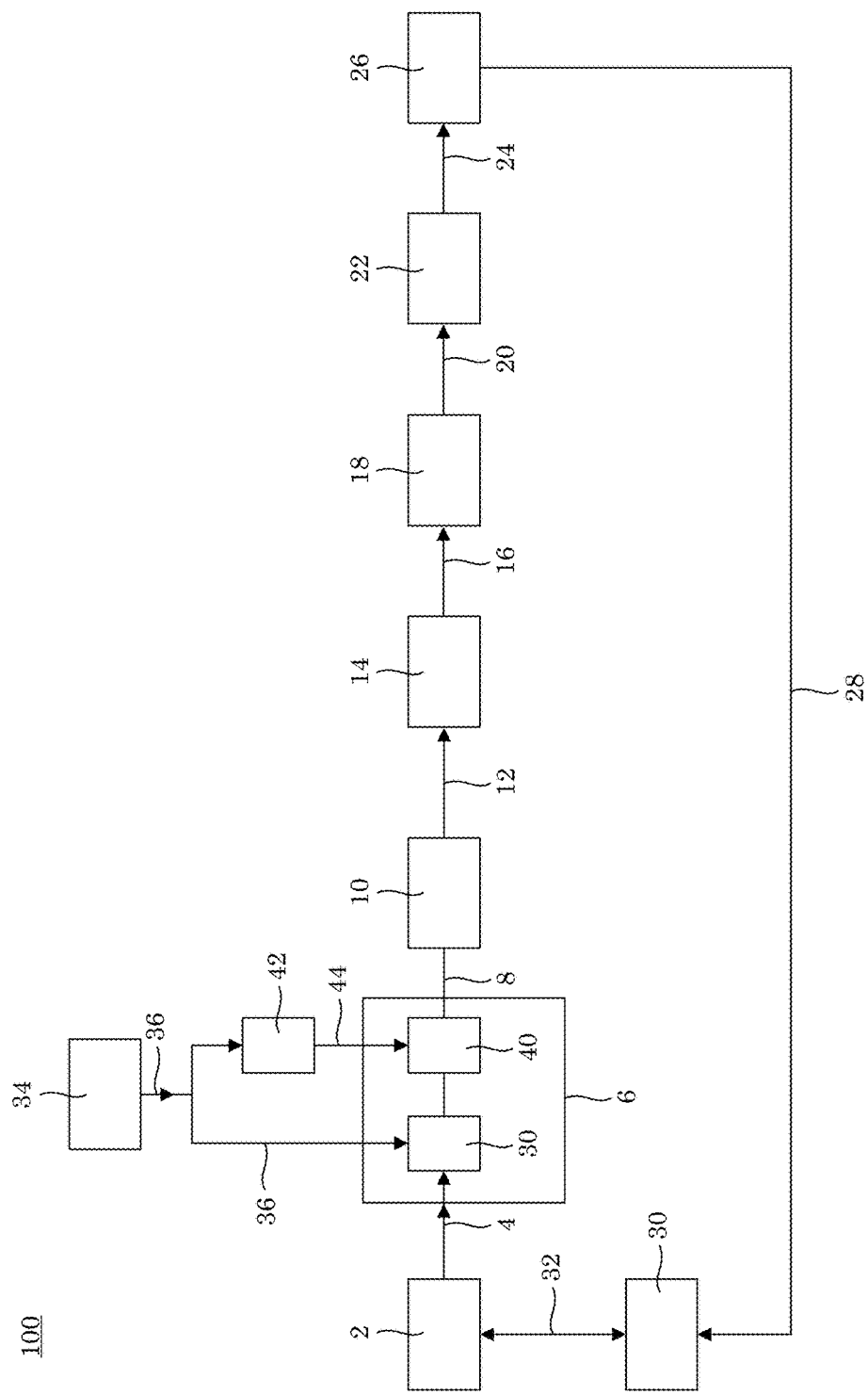
FIG. 6 shows an electronic light synthesizer.

In an embodiment, with reference to FIG. 6, microwave modulator 6 includes intensity modulator 38 and phase modulator 40 in optical communication with intensity modulator 38. Further, phase shifter 42 can be in communication with microwave frequency source 34 and phase modulator 40 such that phase shifter 42 receives microwave repetition frequency 36 from microwave frequency source 34, phase shifts microwave repetition frequency 36 to produce microwave repetition frequency 44 received by phase modulator 40 that is phase shifted with respect to microwave repetition frequency 36.

Figure 7:
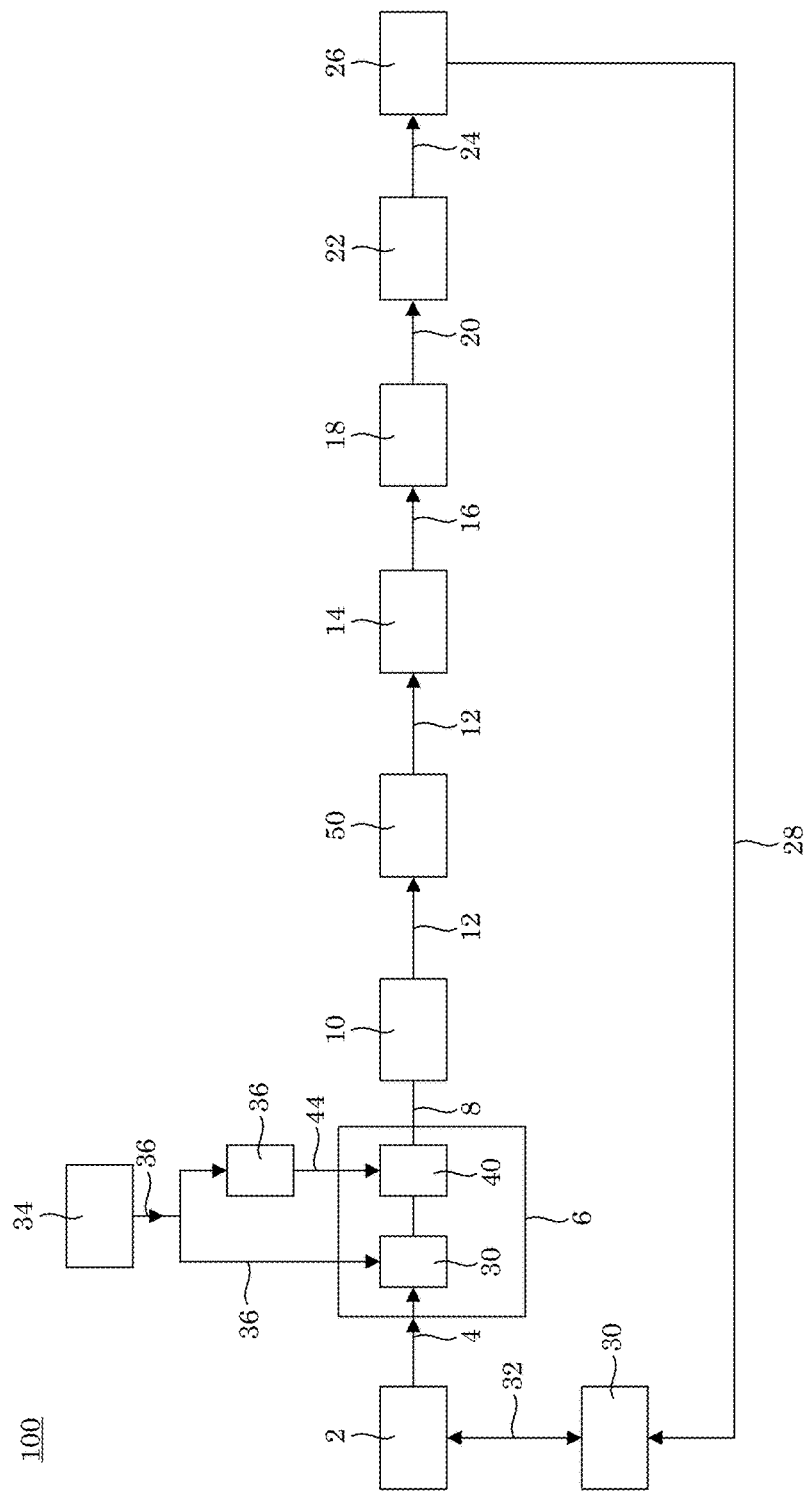
FIG. 7 shows an electronic light synthesizer.
Figure 8:
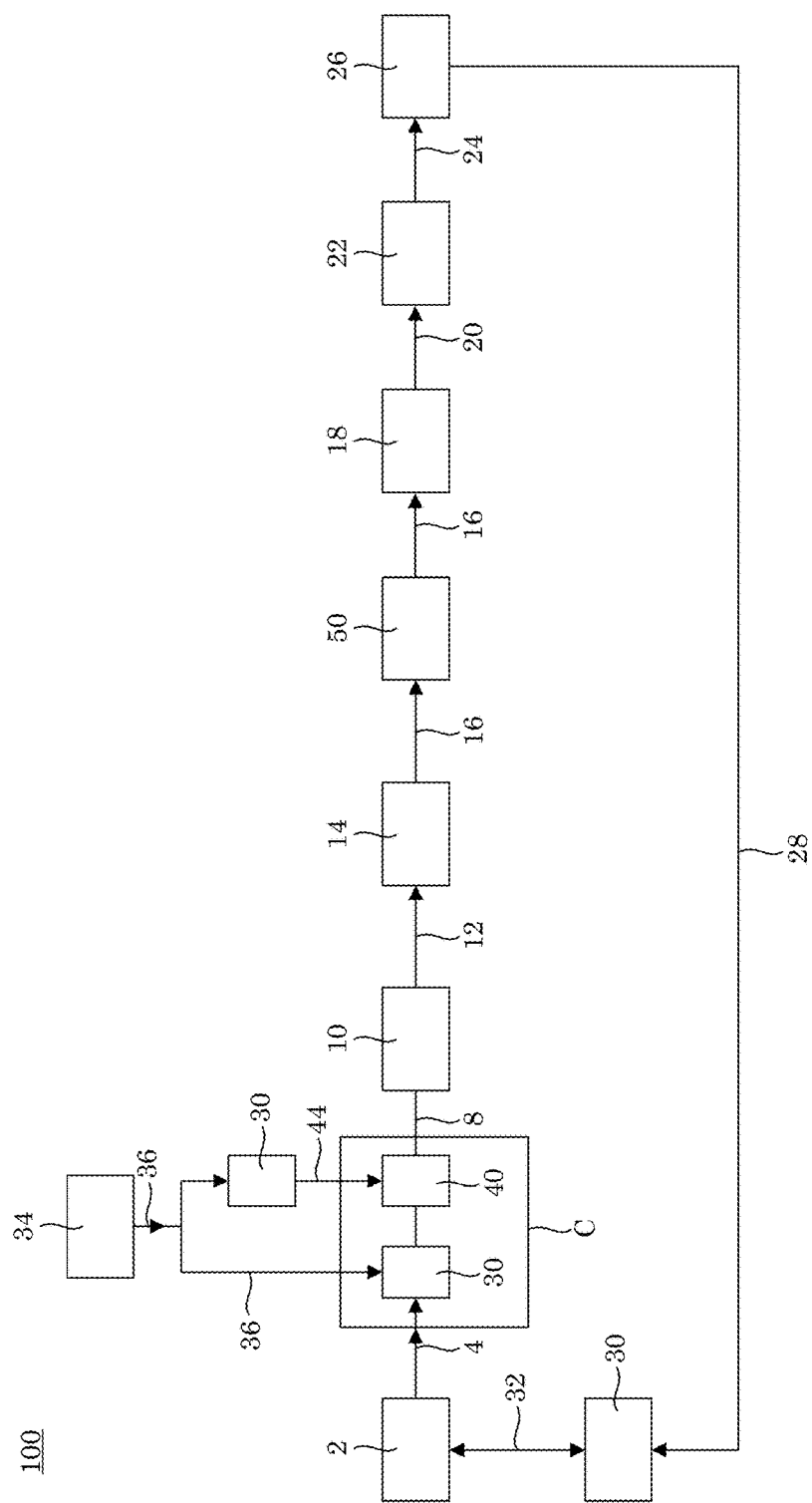
FIG. 8 shows an electronic light synthesizer.

In an embodiment, with reference to FIG. 7 and FIG. 8, electronic light synthesizer 100 includes spatial light modulator 50 optically interposed between self-phase modulator 10 and supercontinuum generator 18. In a certain embodiment, spatial light modulator 50 is optically interposed between self-phase modulator 10 and optical filter 14 as shown in FIG. 7. In some embodiments, spatial light modulator 50 is optically interposed between optical filter 14 and supercontinuum generator 18.

Figure 9:
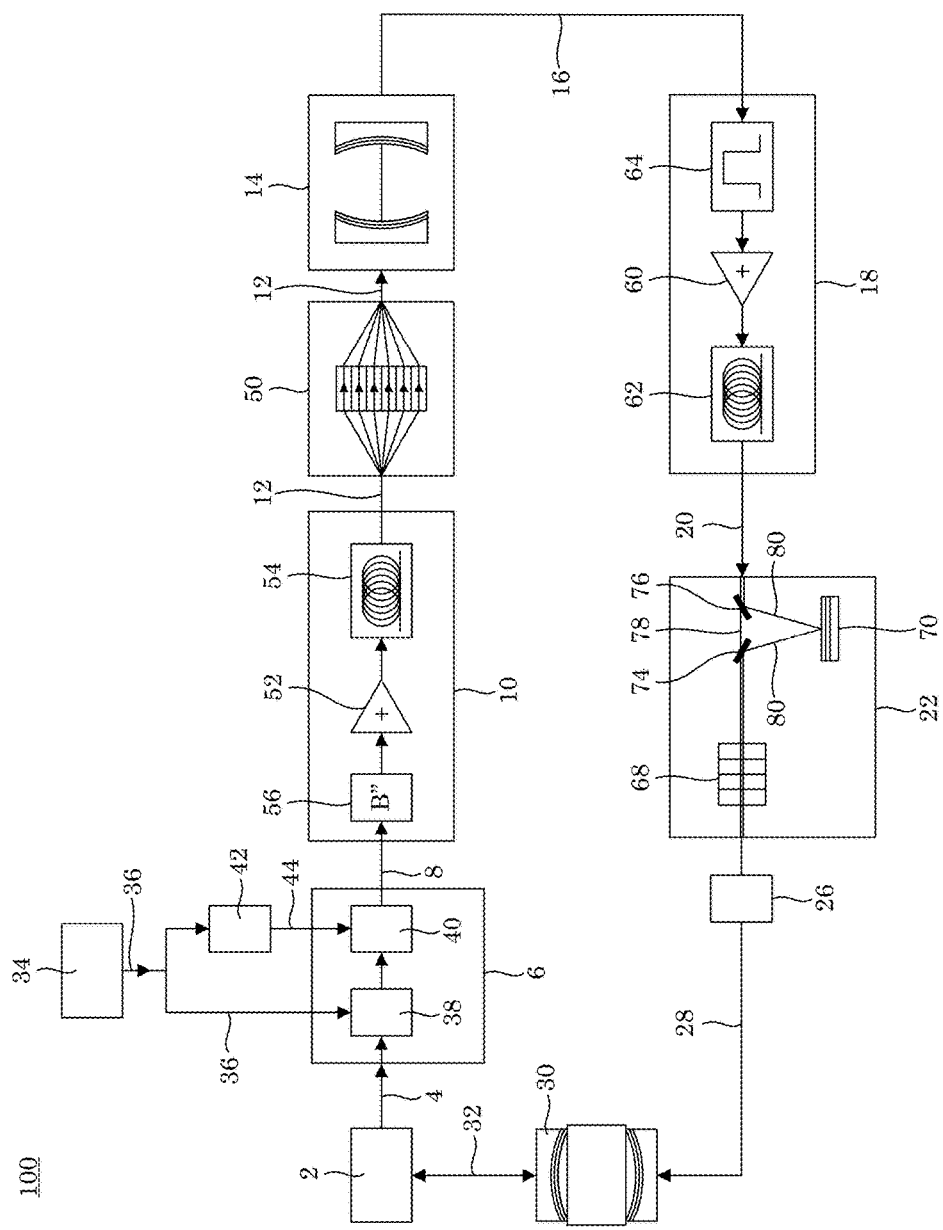
FIG. 9 shows an electronic light synthesizer.

In an embodiment, with reference to FIG. 9, self-phase modulator 10 includes optical amplifier 52 and highly-nonlinear fiber 54 in optical communication with optical amplifier 52. Self-phase modulator further can include dispersion compensator 56 in optical communication with optical amplifier 52. In an embodiment, supercontinuum generator 18 includes optical amplifier 60 and highly-nonlinear fiber 62 in optical communication with optical amplifier 60. In some embodiments, supercontinuum generator 18 includes gate 64 in optical communication with optical amplifier 60, wherein gate 64 changes the microwave repetition frequency of broadened light 16 prior to production of supercontinuum light 20.

In electronic light synthesizer 100, continuous wave light source 2 provides continuous wave light 4. Continuous wave light source 2 can be a CW laser operating at a wavelength from 250 nanometers (nm) to 3000 nm, specifically from 300 nm to 2500 nm, and more specifically from 300 nm to 2000 nm, corresponding to an optical frequency from 100 terahertz (THz) to 100 gigahertz (GHz), specifically from 100 THz to 200 THz, and more specifically from 100 THz to 200 THz. An average power of continuous wave light source 2 can be 10 watts (W) to 10 W, specifically from 10 W to 10 W, and more specifically from 10 W to 10 W. A bandwidth of continuous wave light 4 from continuous wave light, source 2 can be from 2 megahertz (MHz) to 10 MHz, specifically from 2 MHz to 10 MHz, and more specifically from 2 MHz to 10 MHz. Exemplary CW lasers include, semiconductor diode lasers; erbium-, ytterbium-, or thulium-doped optical fiber lasers; microresonator-based laser utilizing nonlinear optical interactions to generate continuous-wave laser light, and heterogeneously integrated laser sources. In a particular embodiment, continuous wave light source 2 is a CW laser providing continuous wave light 4 having a wavelength of 1000 nm (300 THz) with an average power of 3 W and a bandwidth of 0.2 megahertz (MHz) in air. It will be appreciated that frequency comb 8 is produced from continuous wave light 4 from continuous wave light source, wherein a mode locked laser is absent from production of frequency comb 8.

In electronic light synthesizer 100, microwave frequency source 34 provides microwave repetition frequency 36 to microwave modulator 6. Microwave frequency source 34 can be a synthesized signal generator, a dielectric resonator oscillator, or a microwave-cavity stabilized oscillator operating at a microwave frequency from 300 MHz to 300 GHz, specifically from 1 GHz to 100 GHz, and more specifically from 1 GHz to 30 GHz. An average power of microwave frequency source 34 can be 10 W to 10 W, specifically from 10 W to 10 W, and more specifically from 10 W to 10 W. In a particular embodiment, microwave frequency source 34 is dielectric resonator oscillator phase locked to a reference oscillator source providing microwave repetition frequency 36 at 10 GHz with an average power of 3 W.

In electronic light synthesizer 100, intensity modulator 38 intensity modulates the laser at the microwave repetition frequency and can be any intensity modulator source with sufficient modulation bandwidth and depth, and insertion loss, including a lithium niobate waveguide intensity modulator, a rib-waveguide lithium niobate intensity modulator, a microresonator intensity modulator, or a polymer intensity modulator. Phase modulator 40 is in optical communication with intensity modulator 38 and provides a phase modulation of the intensity modulated continuous wave light and can be any optical phase modulator with sufficient modulation index, including a lithium niobate waveguide phase modulator, a rib-waveguide lithium niobate phase modulator, an alumin-nitride waveguide phase modulator, or an opto-mechanical phase modulator. Here, the phase of the microwave repetition frequency received by intensity modulator 38 and phase modulator 40 from microwave frequency source 34 can be out of phase or in phase, and phase difference between microwave repetition frequency 36 received by intensity modulator 38 and microwave repetition frequency 44 received by phase modulator 40 can be adjusted by phase shifter 42. The phase difference can be from 0° to 180°, specifically from 0° to 180°, and more specifically from 0° to 180°. In this manner, frequency comb 8 produced by microwave modulator 6 can have microwave repetition frequency 36 and an optical frequency centered at the optical frequency of continuous wave light 4 with an optical bandwidth that is broader than continuous wave light 4, specifically an optical bandwidth from 1545 nm to 1555 nm with 30 GHz microwave repetition frequency, and more specifically from 1547 nm to 1553 nm with 10 GHz microwave repetition frequency.

In electronic light synthesizer 100, optical amplifier (e.g., 52, 60) receives light having a first intensity and amplifies the light to have a second intensity that is greater than the first intensity. Optical amplifiers (52, 60) independently can be, e.g., erbium-doped fiber amplifiers, erbium-ytterbium-codoped fiber amplifiers, semiconductor amplifiers, Raman-gain fiber amplifiers, and optical parametric amplifiers. In an embodiment, optical amplifier 52 is an erbium-ytterbium codoped fiber amplifier in which approximately 500 mW of amplified light is generated.

In electronic light synthesizer 100, self-phase modulator 10 and supercontinuum generator 18 include highly-nonlinear fiber (e.g., 54, 62) that receives light having a first wavelength range and broadens the first wavelength range to a second wavelength range that is broader than the first wavelength range. Highly-nonlinear fiber (e.g., 54, 62) independently can include, e.g., fused-silica highly nonlinear fiber or chip-based waveguides based on silica, silicon nitride, silicon, aluminum-gallium-arsenide, or aluminum nitride. In an embodiment, highly-nonlinear fiber (54, 62) has 101 meters of length and a dispersion of 0.004 ps/nm/km In self-phase modulator 10, dispersion compensator 56 can receive frequency comb 8 and provides dispersion compensation by providing a deterministic phase delay to the different spectral components of the frequency comb. Exemplary dispersion compensators 56 include an optical fiber, a diffraction grating pair for dispersion compensation, a programmable line-by-line phase and amplitude controller using a spatial light modulator, or a piece of bulk material with sufficient dispersion characteristics. In an embodiment, dispersion compensator 56 is the optical fiber.

In some embodiments, electronic light synthesizer 100 includes spatial light modulator 50 to receive broadened light 12 from self-phase modulator 10 or optical filter 14. Here, spatial light modulator 50 receives broadened light 12 and provides line-by-line amplitude and phase control of the frequency comb. Spatial light modulator 50 can include, e.g., a liquid-crystal device or any Fourier synthesis method for optical pulse shaping. In an embodiment, spatial light modulator 50 is a liquid-crystal on silicon programmable spatial light modulator pulse shaper.

In some embodiments, electronic light synthesizer 100 includes optical filter 14 to receive broadened light 12 from self-phase modulator 10 or spatial light modulator 50. Optical filter 14 optically filters electronic noise in broadened light 12 by providing a resonant transmission spectrum frequency-aligned to the electro-optic frequency comb to produce broadened light 16 that is communicated to supercontinuum generator 18. It is contemplated that optical filter 14 can include, e.g., a cavity such as a Fabry-Perot cavity, or a whispering gallery mode cavity. In an embodiment, optical filter 14 is the plano-concave Fabry-Perot optical cavity produced by counterpropagating reflection from two mirrors.

In some embodiments, supercontinuum generator 18 of electronic light synthesizer 100 includes gate 64 that receive broadened light 16 optical filter 14. Gate 64 changes the microwave repetition frequency of broadened light 16 prior to production of supercontinuum light 20 by electronically selecting certain pulses from the pulse train through optical intensity modulation. It is contemplated that gate 64 can include, e.g., a waveguide lithium-niobate intensity modulator. It is contemplated that the optical gate can be the lithium-niobate waveguide intensity modulator driven by an electronic signal derived from the microwave frequency source, wherein a timing of the intensity modulator gate is aligned to the timing of the pulse train that enters the intensity modulator.

In some embodiments, electronic light synthesizer 100 includes self-referencing interferometer 22 that receives supercontinuum light 20 from supercontinuum generator 18 and produces interference light 24 that includes primary optical frequency f1 and doubled optical frequency f2. Here, self-referencing interferometer 22 can include splitter mirror 76 (e.g., a dichroic mirror) that receives supercontinuum light 20, transmits shorter wavelength light 78 to splitter mirror 78 (e.g., a broadband mirror), and reflects longer wavelength light 80 to mirror 70 (e.g., a broadband mirror with tunable position to change the optical timing delay of the interferometer). Mirror 70 receives longer wavelength light 80, provide a tunable timing delay of the longer wavelength light and communicates longer wavelength light 80 to second harmonic generator 68 (e.g., a periodically poled lithium niobate crystal). Second harmonic generator 68 produces interference light 24 that contains primary optical frequency f1 and doubled optical frequency f2 to detect the carrier-envelope-offset frequency of the electro-optic frequency comb after supercontinuum generation. Thereafter, optical detector 26 receives interference light 24 and produces carrier-envelope offset frequency 28 by direct photodetection of the optical interference. Optical detector 26 can be, e.g., a InGaAs photodetector, and InGaAs photodetector with transimpedance amplifier, or an. InGaAs avalanche photodetector.

Reference cavity 30 receives carrier-envelope offset frequency 28 from optical detector 26 and controls the optical frequency of continuous wave light 2 via reference optical signal 32 communicated between reference cavity 30 and continuous wave light source 2. Here, control can be accomplished by an acousto-optic frequency shift of the reference optical frequency. Exemplary reference cavities ultralow expansion glass Fabry-Perot reference cavities.

In an embodiment, a process for making electronic light synthesizer 100 includes disposing microwave modulator 6 in optical communication with continuous wave light source 2; disposing self-phase modulator 10 in optical communication with microwave modulator 6; disposing optical filter 14 in optical communication with self-phase modulator 10; and disposing supercontinuum generator 18 in optical communication with optical filter 14. Here, disposing microwave modulator 6 in optical communication with continuous wave light source 2 can be accomplished by a direct optical fiber termination through e.g. an FC/APC termination unit. Moreover, disposing self-phase modulator 10 in optical communication with microwave modulator 6 can be accomplished by a direct optical fiber termination between two optical fibers using e.g. a FC/APC termination unit. Further, disposing optical filter 14 in optical communication with self-phase modulator 10 can be accomplished by a direct optical fiber termination between two optical fibers using e.g. a FC/APC termination unit. It is contemplated that disposing supercontinuum generator 18 in optical communication with optical filter 14 can occur by an optical fiber to free-space termination using a lens to collimate the light from the optical fiber.

Electronic light synthesizer 100 has numerous beneficial uses, including electronically synthesizing light. With reference, e.g., to FIG. 9, electronic light synthesizer 100 can include a 1550 nm CW laser as continuous wave light source 2 stabilized to a high-finesse, low-expansion Fabry-Perot cavity as reference cavity 30. Frequency comb 8 is produced by optical phase and intensity modulation with waveguide lithium-niobate devices (38, 40) at modulation frequency $f_{eo}$ as the microwave repetition frequency that transforms continuous wave light 4 into light pulses of frequency comb 8 that are repeated with each modulation cycle and provides linear chirp that yields pulses with a spectral envelope that is relatively flat as shown in panel A of FIG. 10 and panel A of FIG. 11 for frequency combs 8 with 10 GHz and 33 GHz spacing, respectively. A bandwidth of respective frequency combs 8 is less than 1 THz. Subsequent spectral broadening of frequency comb 8 includes compensating a spectral-phase profile of frequency comb 8 using second-order dispersion. Propagation of a 50% duty cycle pulse train of frequency comb 8 through a selected length of 1550 nm single-mode fiber (SMF) as dispersion compensator 56 provides pulse compression to near a Fourier-transform limit.

Figure 10:
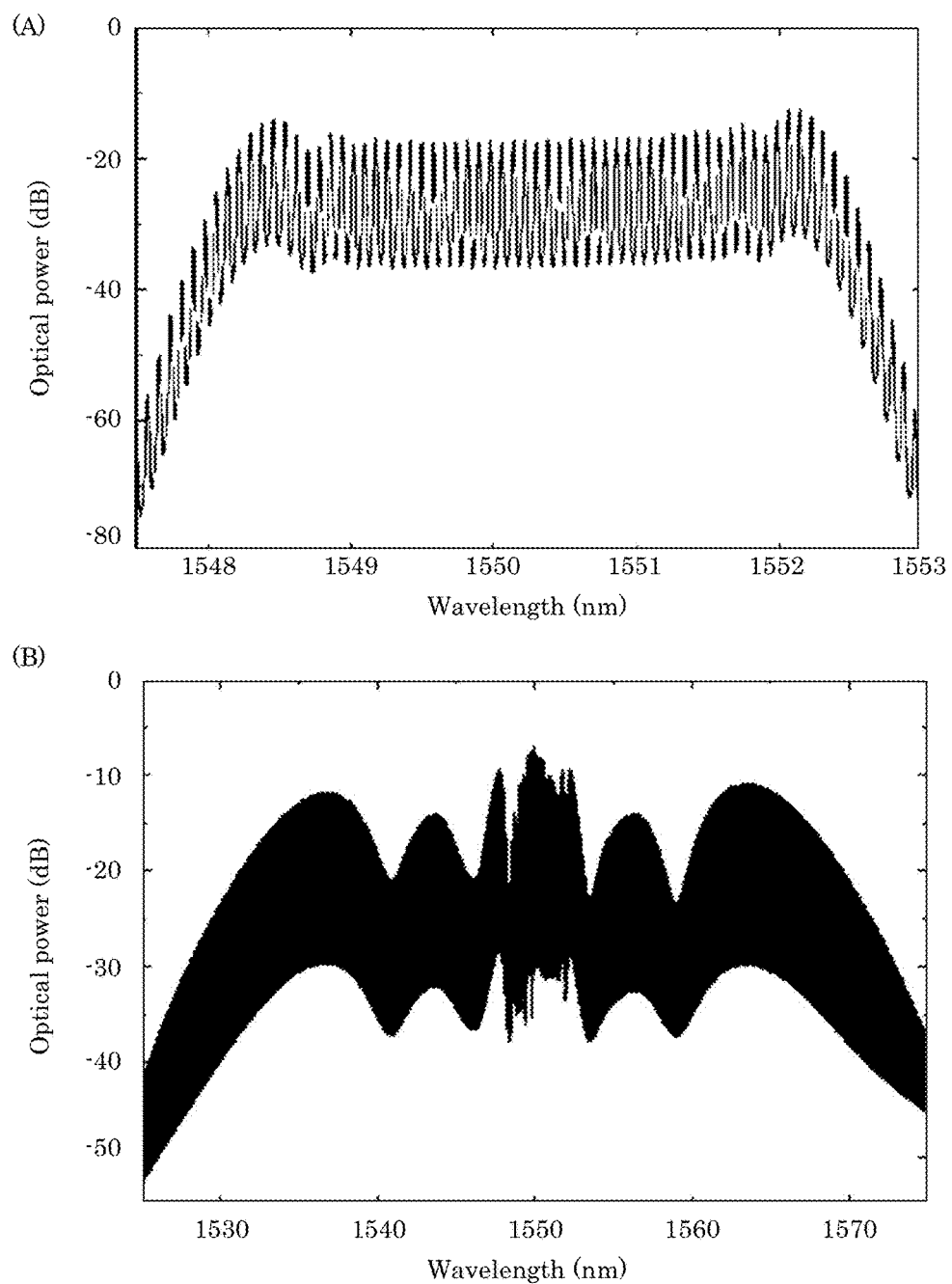
FIG. 10 shows a graph of optical power versus wavelength for a frequency comb with a 10 gigahertz (GHz) spacing in panel A, and panel B shows a graph of optical power versus wavelength for the comb shown in panel A after being subjected to broadening by a self-phase modulator.
Figure 11:
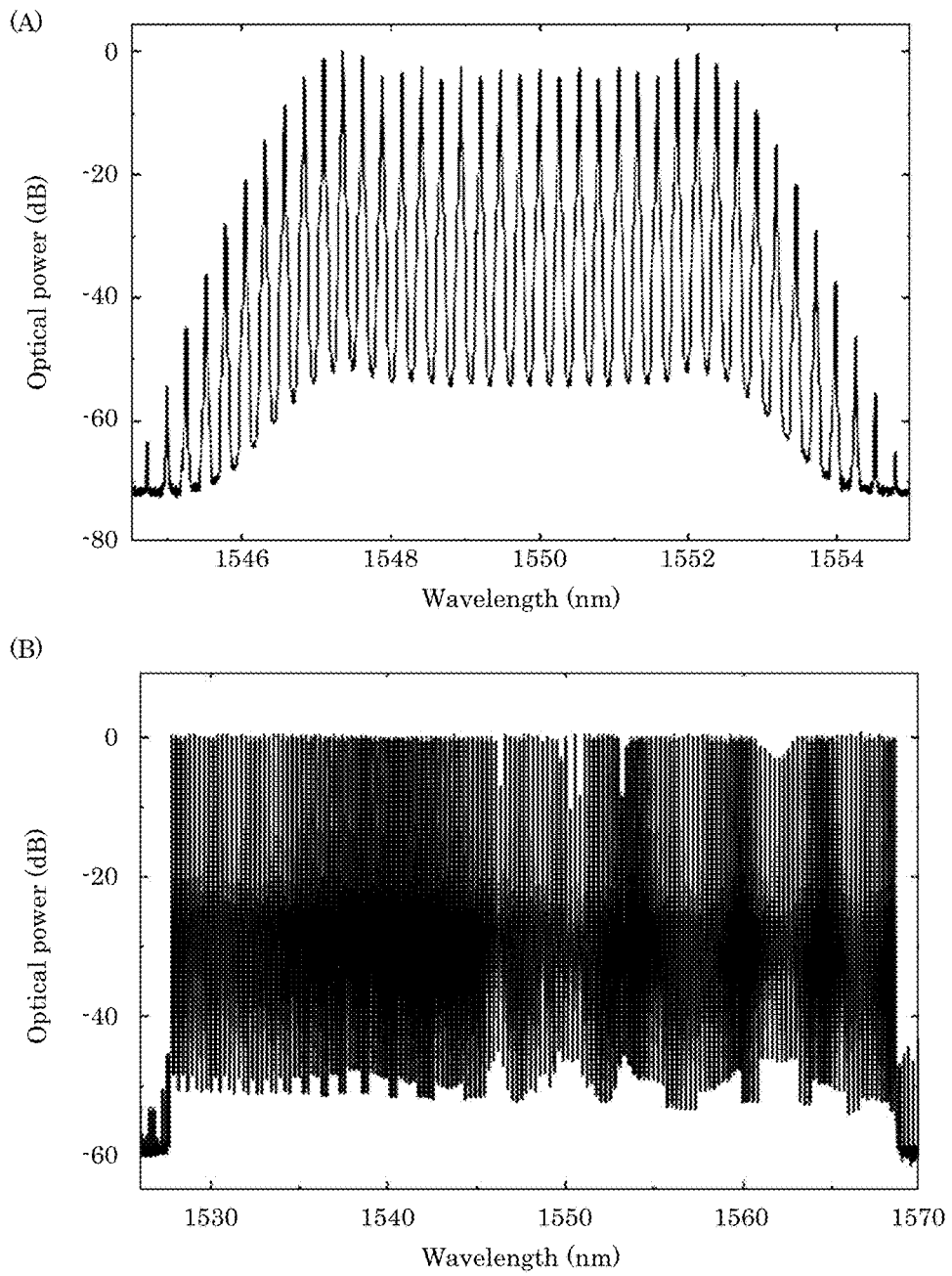
FIG. 11 shows a graph of optical power versus wavelength for a frequency comb with a 33 GHz spacing in panel A, and panel B shows a graph of optical power versus wavelength for the comb shown in panel A after being subjected to broadening by a self-phase modulator and line-line intensity control by a spatial light modulator.

To increase an optical bandwidth of frequency comb 8 for self-referencing, two stages of spectral broadening are provided by self-phase modulator 10 and supercontinuum generator 18 via highly-nonlinear fiber (54, 62) (HNLF). Advantageously and unexpectedly, electronic light synthesizer 100 provides supercontinuum light 20 as a coherent, octave-spanning frequency comb seeded by relatively long optical pulses (e.g., 1.5 picoseconds (ps) for 10 GHz microwave repetition frequency). In self-phase modulator 10, frequency comb 8 is amplified, e.g., to 500 mW, by optical amplifier 52, e.g., a commercial erbium-doped fiber amplifier (EDFA), and frequency comb 8 is guided through, e.g., 100-m length near-zero-dispersion, HNLF 54. The optical spectrum of resulting broadened light 12 is characteristic of self-phase modulation (SPM). Panel B of FIG. 10 shows broadened light 12 (for a 10 GHz frequency comb 8 shown in panel A of FIG. 10) following self-phase modulator 10. Panel B of FIG. 11 shows broadened light 12 (for a 33 GHz frequency comb 8 shown in in panel A of FIG. 11), wherein use of spatial light modulator 50 provided line-by-line power flattening after self-phase modulator 10.

Supercontinuum generator 18 coherently increase the EOM-comb span of broadened light 16 to greater than 1000 nm for f-2f self-referencing that is provided by self-referencing interferometer 22. As shown in FIG. 9, broadened light 16 is re-amplified with a cladding-pumped, anomalous dispersion Er/Yb co-doped fiber as optical amplifier 60 to attain, e.g., 140 pJ, 400 pJ, and 560 pJ pulses for the 33 GHz, 10 GHz, 2.5 GHz microwave repetition frequency, respectively. The 2.5 GHz supercontinuum light 24 is obtained by attenuating three out of every four 10 GHz pulses using a waveguide lithium-niobate intensity modulator as gate 64. Here, the Er/Yb amplifier provided a maximum average power of 4.5 W, and the temporal intensity autocorrelation of optical pulses of broadened light 16 that exited optical amplifier 60 had a duration that was less than 300 femtoseconds (fs) in duration. Prior to supercontinuum generator 18, polarization and dispersion was adjusted to maximize production of supercontinuum light 24 in highly-nonlinear fiber 62. It is contemplated that second-order dispersion can be applied in increments of 0.005 $ps^2$ using a line-line pulse shaper, e.g., spatial light modulator 50.

Figure 12:
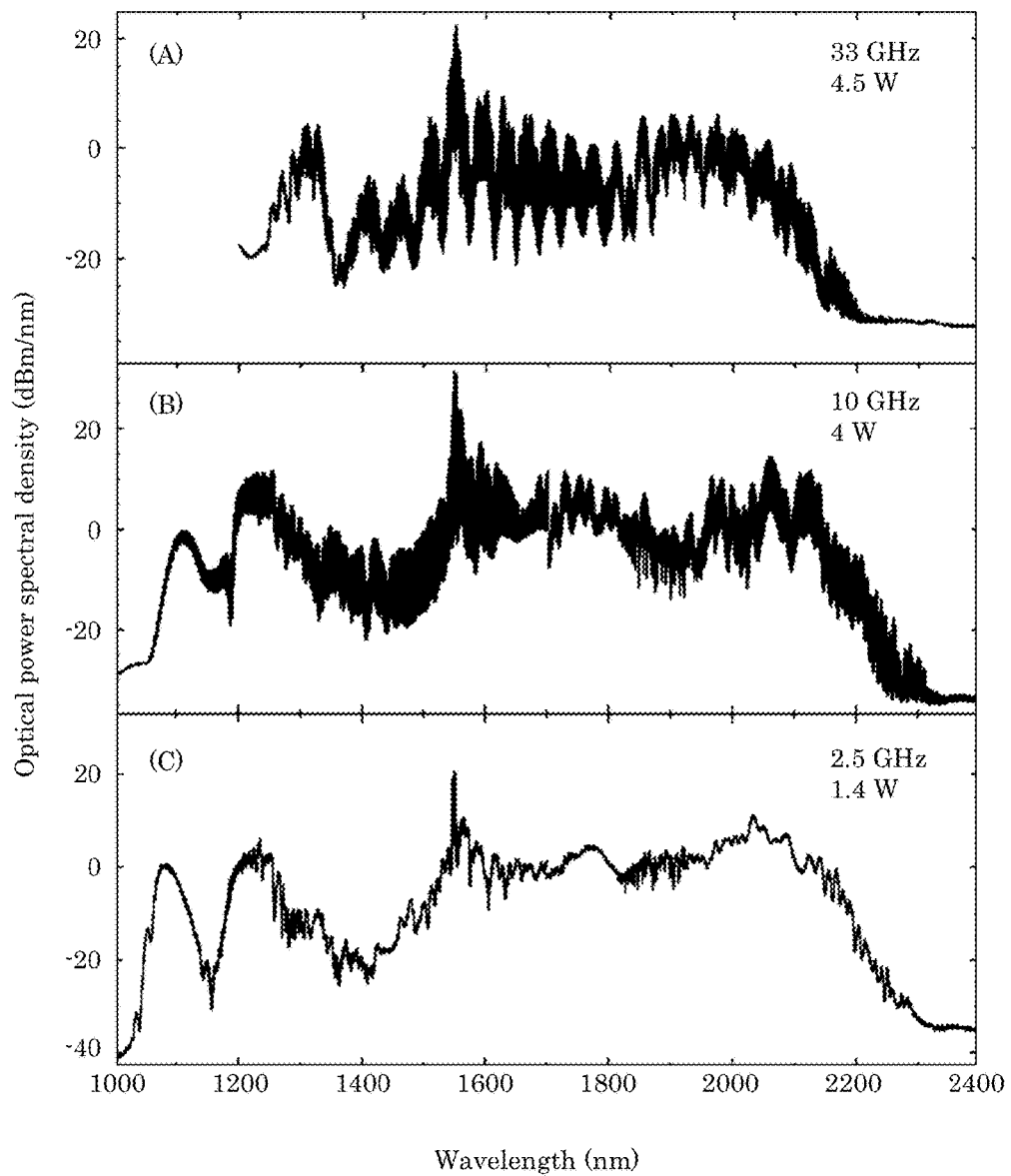
FIG. 12 shows a graph of optical power spectral density versus wavelength for supercontinuum light with a 33 GHz spacing in panel A, with a 10 GHz spacing in panel B, and with a 2.5 GHz spacing in panel C.

Highly-nonlinear fiber 62 of supercontinuum generator 18 can include, e.g., a plurality of segments (e.g., to segments)

of nonlinear fiber with different spectral-dispersion profiles. The segment can be fusion spliced together to provide greater than 80% transmission. The first segment can have a dispersion zero near, e.g., 1300 nm. The dispersion of the second segment can be, e.g., 1.5 ps/nm-km. In this manner, electronic light synthesizer 100 overcomes supercontinuum decoherence mechanisms associated with a greater than 100 fs pulse duration. FIG. 12 shows graphs of ultrabroad spectra for supercontinuum light 24, wherein the 10 GHz and 2.5 GHz supercontinuum light had more than one octave of bandwidth. Teeth of the 10 GHz supercontinuum light and 33 GHz supercontinuum light are present across the spectra.

Figure 13:
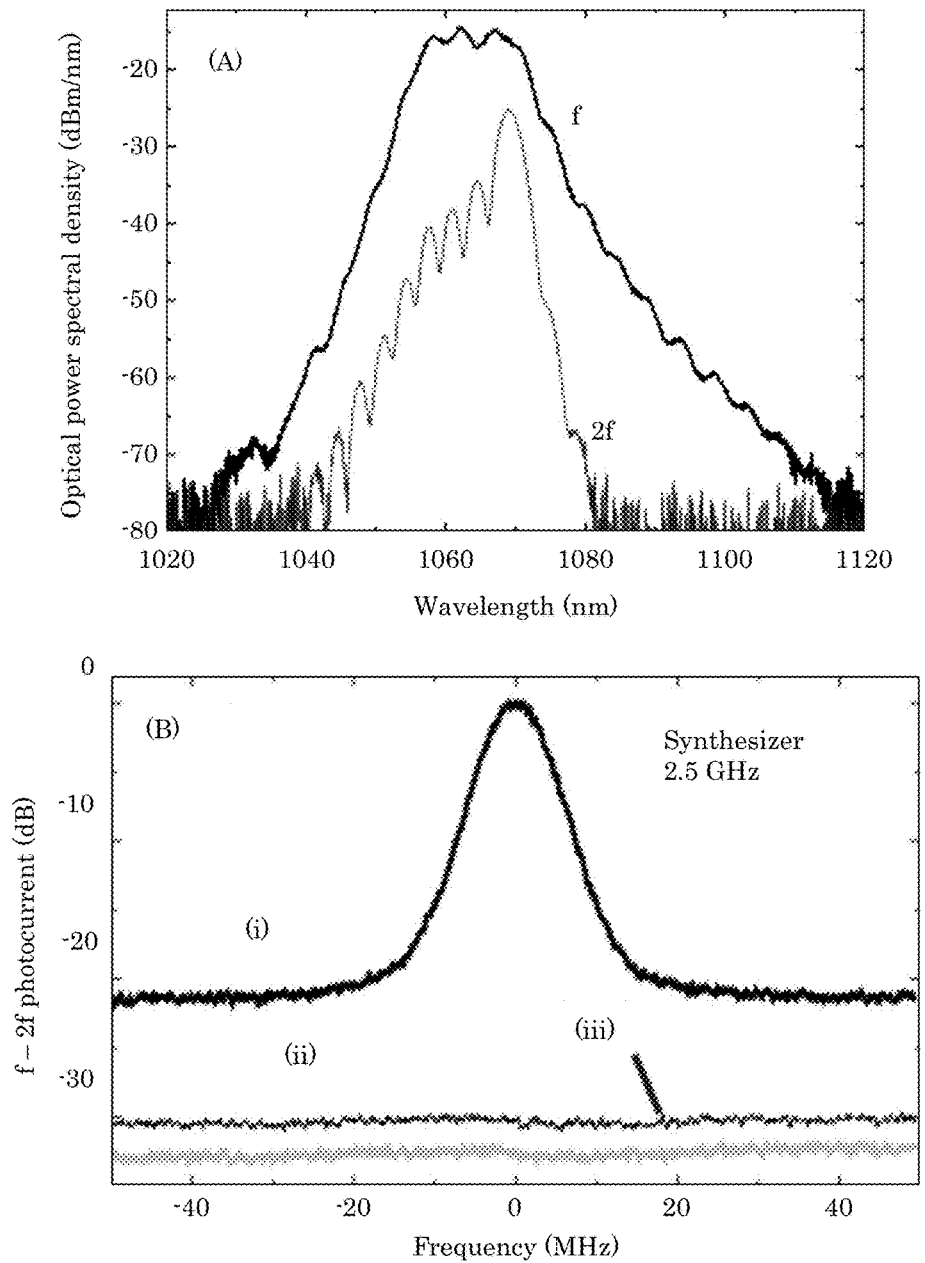
FIG. 13 shows a graph of optical power spectral density versus wavelength in panel A, and a graph of f-2 photocurrent versus frequency in panel B.

Following supercontinuum generation of supercontinuum light 24 by supercontinuum generator 22, carrier-envelope-offset frequency 28 of supercontinuum light 24 is produced by optical detector 26. Here, a 10-mm sample of periodically poled lithium niobate as second harmonic generator 68 generates the second harmonic of supercontinuum light 20 at 2140 nm. Panel A of FIG. 13 shows separately obtained optical spectra of primary optical frequency f1 and doubled optical frequency 2f components at 1070 nm for the 2.5 GHz supercontinuum light 24. Optical detector 26 photo detected the optical heterodyne beat of the two spectra and optimized alignment of relative arrival time and polarization thereof. Photocurrent from optical detector 26 provided offset frequency $f_0$ as carrier-envelope offset frequency 28 of supercontinuum light 24. Carrier-envelope offset frequency 28 represents generation of an effective optical frequency reference through extreme multiplication of the microwave $f_{eo}$ as microwave repetition frequency 36. Panel B of FIG. 13 shows an RF spectrum of the offset frequency $f_0$ in presence of optical filter 14 that had a 7 MHz full width half maximum (FWHM) linewidth and insertion loss of 8 dB for broadened light 12.

Figure 14:
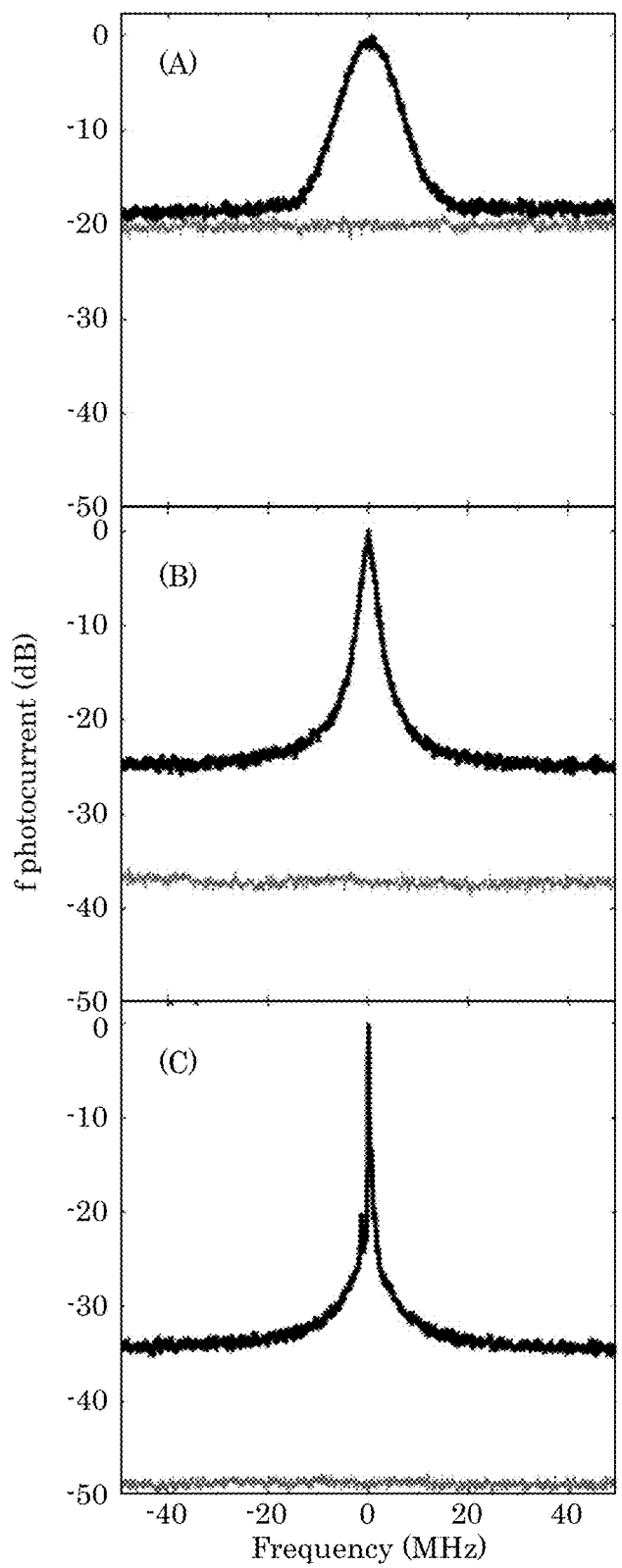
FIG. 14 shows graphs of carrier-envelope offset frequency versus frequency.

Electronic spectrum analyzer traces of carrier-envelope offset frequency 28 of 2.5 GHz supercontinuum light and its background contributions are shown in panel B of FIG. 13, wherein trace (i) is the signal, and trace (ii) and trace (iii) represent supercontinuum intensity noise and photodetector noise, respectively. Panel A of FIG. 14 shows the 10 GHz supercontinuum light. Since the comb spacing $f_{eo}$=9.999 952 GHz is locked to a hydrogen-maser frequency reference as microwave frequency source 34 traceable to the International System (SI), detecting the center of the spectrum for carrier-envelope offset frequency 28 represents an absolute determination of optical frequency $v_p$ of continuous wave light 4 from continuous wave light source 2. Frequency counting experiments with $f_0$ are enabled by a high signal-noise ratio (SNR) and a narrow spectral width. The noise floor of $f_0$ exceeds the intensity noise by 8 dB. Carrier-envelope offset frequency 28 provides a phase-coherent link between the microwave and optical domains.

The linewidth of $f_0$ as carrier-envelope offset frequency 28 can be determined by a level of phase noise of microwave repetition frequency $f_{eo}$ 36 at Fourier frequencies from, e.g., approximately 10 kHz to 10 MHz. In this range, a high modulation index leads to broadening of carrier-envelope offset frequency $f_0$ 28. A power spectrum of carrier-envelope offset frequency $f_0$ 28 using three separate $f_{eo}$ oscillators as different microwave frequency sources 34 was acquired, wherein microwave frequency sources 34 had different 10 kHz to 10 MHz phase-noise levels. Panels A, B, and C of FIG. 14 show data acquired using microwave frequency sources 34 with improving phase-noise performance in which the same synthesizer as above excluded pulse picking for a 10 GHz dielectric-resonator oscillator (DRO) and a 10 GHz sapphire-cavity oscillator (sapphire), respectively. The graphs shown in FIG. 14 indicate up to a factor of 40 reduction in linewidth to ~100 kHz with improved performance of microwave repetition frequency 36. Since pulse picking divides the pulse-repetition rate of microwave repetition frequency 36, no linewidth change occurred when using the synthesizer for the 10 GHz and 2.5 GHz combs. The linewidth of carrier-envelope offset frequency measurements provided by the DRO (sapphire) devices had from 10 kHz to 10 MHz integrated phase noise at least a factor of ~9 (~2200) lower than the synthesizer.

Figure 15:
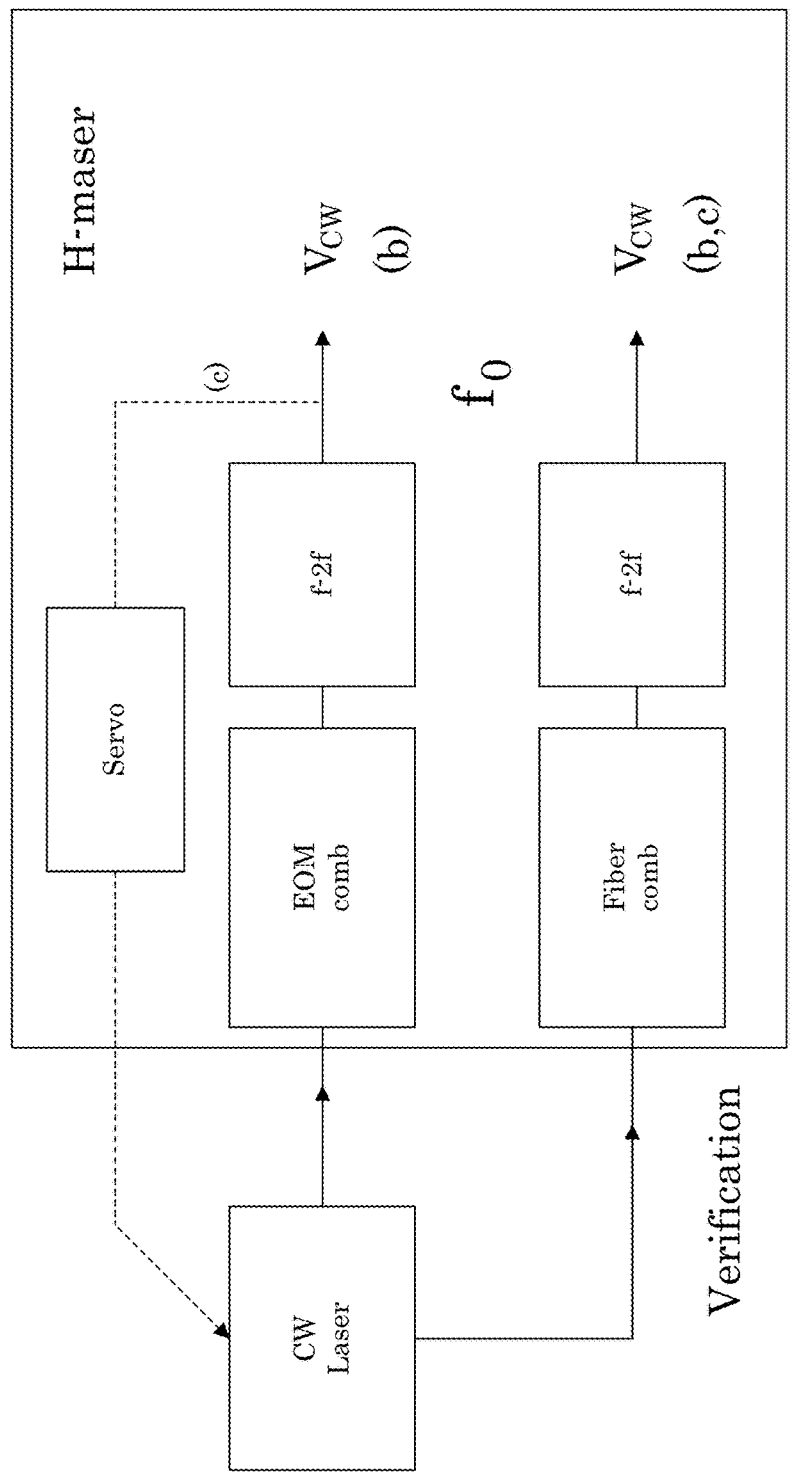
FIG. 15 shows a system to determine an optical frequency of continuous wave light from a continuous wave light source.
Figure 16:
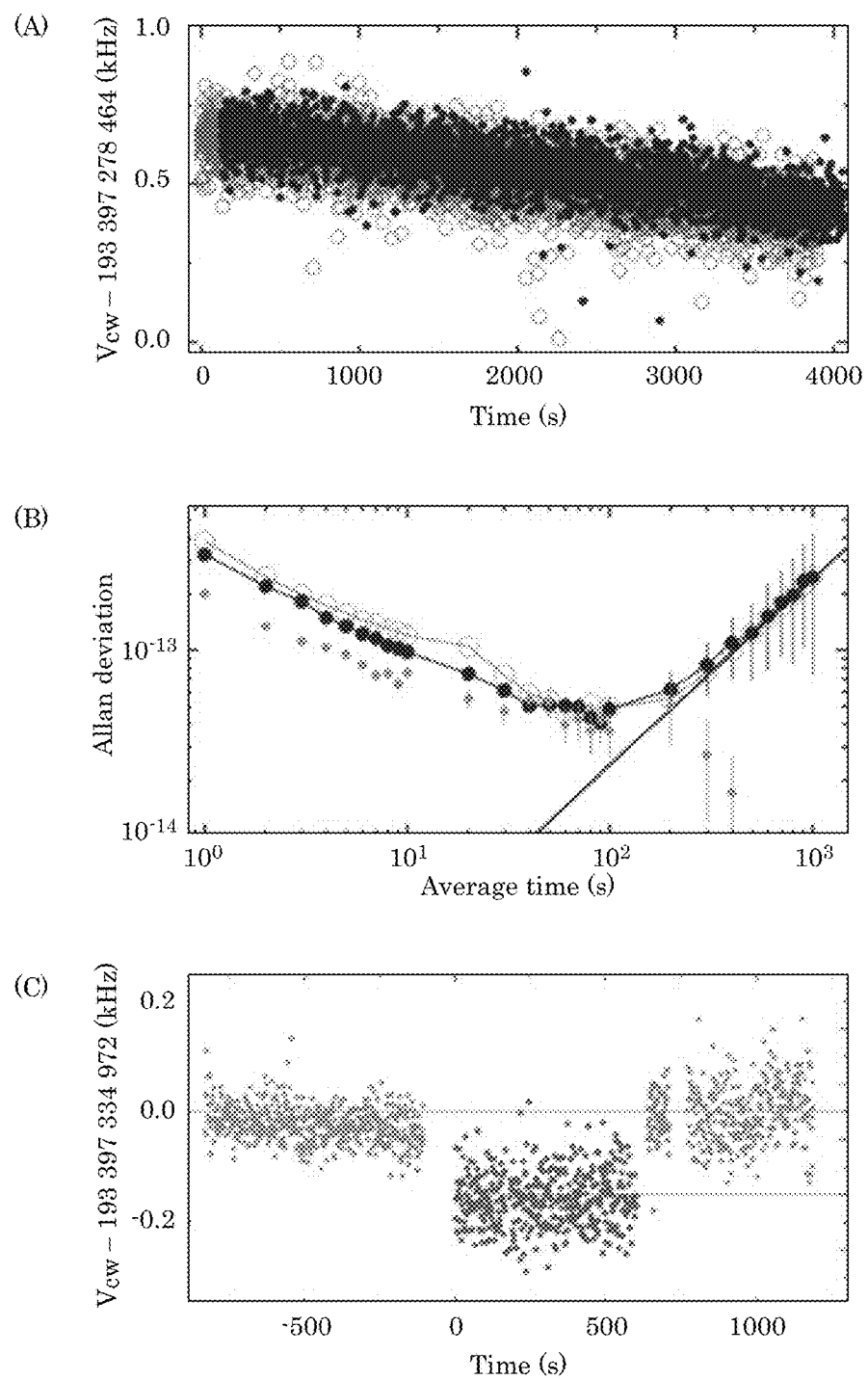
FIG. 16 shows, in panel A, a graph of a frequency difference versus time for the system shown in FIG. 13; panel B shows a graph of Allan deviation versus average time, and panel C shows a graph of a frequency difference versus time.

Access to carrier-envelope offset frequency 28 of supercontinuum light 20 provides an EOM comb for precision experiments, including measurement and synthesis of optical frequencies. FIG. 15 shows optical and electronic connections for production of supercontinuum light 20 driven by the synthesizer as microwave frequency source 34. By frequency counting carrier-envelope offset frequency 28, optical frequency $v_p$ of continuous wave light 4 from continuous wave light source 2 was determined with respect to the EOM-comb spacing of supercontinuum light 20. A frequency counter records carrier-envelope offset frequency $f_0$ 28 after RF filtering and digital frequency division, which phase-coherently reduce fluctuations. Each 1 s measurement yields optical frequency $v_p$ with a fractional uncertainty of $3\times10^{-13}$. As a crosscheck and for comparison, we acquired a separate measurement of optical frequency $v_p$ with respect to the 250.32413 MHz spacing of a self-referenced erbium-fiber frequency comb. Both EOM-comb supercontinuum light 20 and the fiber-comb spacings were referenced to the same hydrogen maser. Panel a of FIG. 16 shows a record over 4000 s during which the optical frequency of continuous wave light 4 from continuous wave light source 2 was determined with supercontinuum light 20 (black points) and fiber comb (green points). These data attract the approximately 65 mHz/s instantaneous linear drift rate of the cavity-stabilized optical frequency $v_p$. Moreover, linear fitting of the two data sets provided an average offset between them of 17 Hz, which was within two standard deviations of the mean of their combined uncertainty.

The optical frequency $v_p$ of continuous wave light 4 from continuous wave light source 2 was stabilized using an RF phase-lock of carrier-envelope offset frequency $f_0$ 28 while microwave repetition frequency $f_{eo}$ 36 from microwave frequency source 34 was held fixed at 9.999952 GHz. here, carrier-envelope offset frequency $f_0$ 28 was phase-coherently filtered and divided by 512 prior to phase discrimination, and feedback was provided to an acousto-optic frequency modulator immediately following continuous wave light source 2. To verify phase lock, panel D of FIG. 16 shows two consecutively obtained frequency-counting modalities with $v_p$: fiber comb measurements (green points) and in-loop fluctuations in the $v_p$ phase lock (blue points). Here, the set point of the $v_p$ phase lock is held constant at 193.397334972 THz, but this value is adjustable within a tuning range of continuous wave light source 2. The data is semi-continuously acquired at 1 s gate time for 2000 s as connections were reconfigured and the phase-lock loop filter adjusted. A mean difference of the green points and the phase-lock set point is −14(8) Hz, and the frequency offset of the in-loop signal scatters closely about zero. Furthermore, the Allan deviation of the locked $v_p$ is shown in panel B of FIG. 16, wherein solid green points fall slightly below the other two Allan deviation measurements and do not show the 65 mHz/s cavity drift because system components are phase-locked to the same maser reference microwave frequency source 34. Accordingly, electronic light synthesizer 100 provides direct electronic synthesis of supercontinuum light 20 with respect to every EOM-comb line.

Electronic light synthesizer 100 has numerous advantageous and beneficial properties. In an aspect, the carrier-envelope offset frequency of the EOM comb of the supercontinuum light is $f_0 = v_p - N\, f_{eo}$, wherein, e.g., a multiplicative factor $N \sim 19340$ relates the exact phase of microwave frequency source 34 to that of $v_p$. Optical filtering by optical filter 14 overcomes inherent noise from microwave oscillators, given their thermal phase noise, that do not support frequency multiplication to the optical domain. Optical filtering reduces the impact of high-frequency oscillator noise and modifies the phase noise Fourier-frequency dependence to $1/f^2$, which is consistent with that of a laser.

Without wishing to be bound by theory, to understand the effect of optical filter 14, we note that solution of an integral equation $\int_{\delta\omega}^{2\pi f_{eo}/2} S_\phi^{(N)} F(\omega) d\omega = 1$ estimates the linewidth $\delta\omega^{(N)}$ of the N-th EOM-comb mode. Here, an EOM-comb mode has phase noise $S_\phi^{(N)} = N^2 S_\phi$, where $S_\phi$ is a constant microwave oscillator spectrum, and $F(\omega)$ is the filter cavity lineshape that is approximated as a rectangle. Even for a conventional 10 GHz oscillator with thermally limited phase noise of −189 dBc/Hz at +12 dBm at 300 K, without filtering, the comb lines needed for self-referencing are estimated to have $\delta\omega^{(19\,340)}/2\pi > 1$ GHz and may be undetectable. By use of optical filter 14 following production of frequency comb 14, contribution from oscillator phase noise is reduced. The result is a negligible projected linewidth contribution to the EOM-comb modes for self-referencing.

Advantageously, unexpectedly, and surprisingly, electronic light synthesizer 100 provides optical frequency synthesis and control of continuous wave light source 2 by electro-optic modulation of continuous wave light 4. To accomplish this, frequency comb 8 is produced as and EOM comb with 600 GHz initial bandwidth, then HNLF-based pulse broadening is used to create an octave-spanning supercontinuum of supercontinuum light 20. Further, electronic light synthesizer 100 provides optical filtering to preserve the optical coherence of frequency comb 8 following frequency multiplication from 10 GHz to 193 THz. Precision optical frequency measurements and phase-lock synthesis of all the comb frequencies is accomplished by electronic light synthesizer 100. As a result, control over microwave-rate mode spacing and frequency tuning of supercontinuum light 20 in electronic light synthesizer 100 can be used for a variety of applications in spectroscopy, astronomy, and communications.

The articles and processes herein are illustrated further by the following Examples, which are non-limiting.

EXAMPLES

Example 1. Time and Spectral Domain Characterization of Supercontinuum Light

Figure 17:
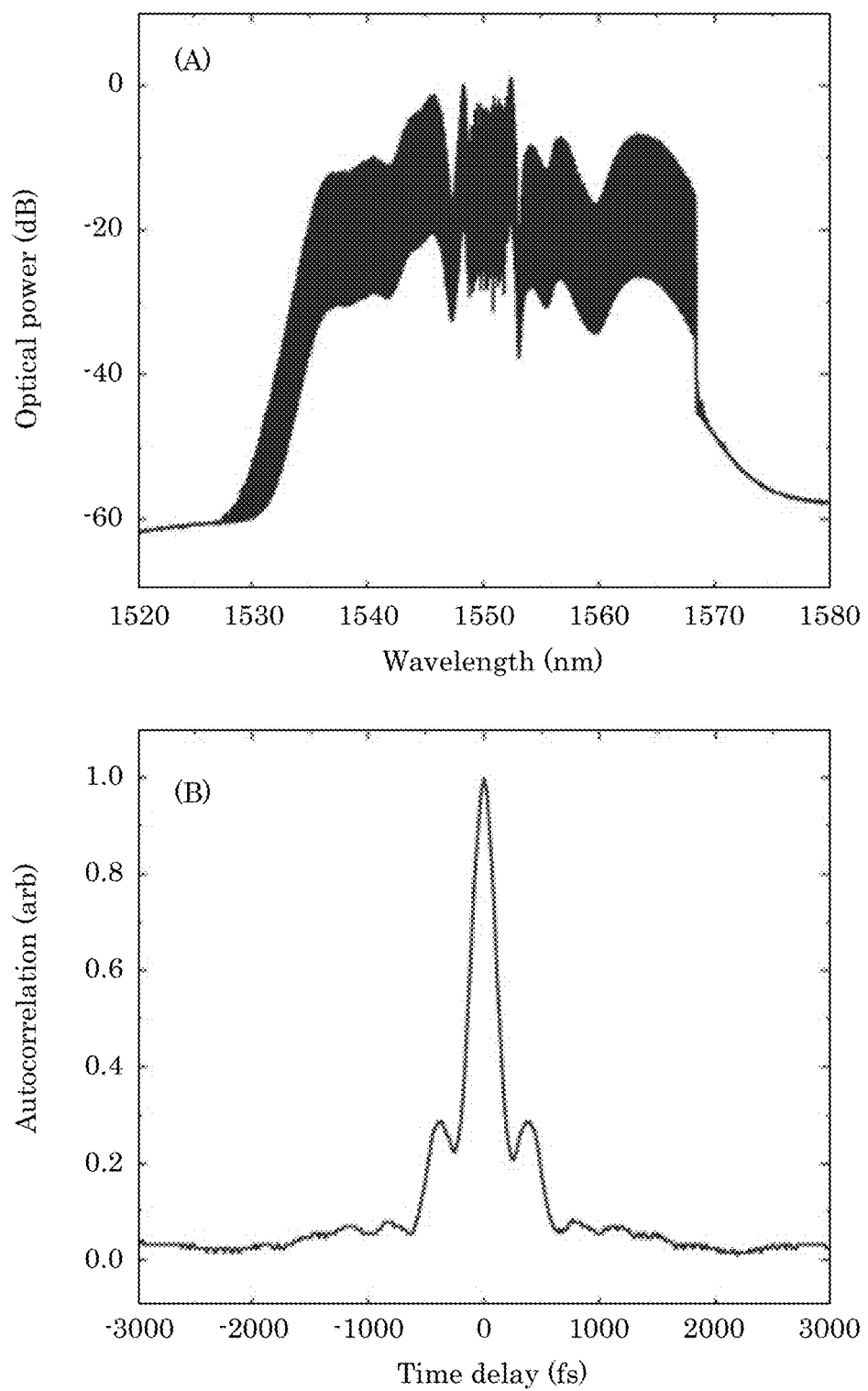
FIG. 17 shows a graph of optical power versus wavelength in panel A, and panel B shows a graph of autocorrelation versus time delay.

An electronic light synthesizer shown in FIG. 9 was constructed. For production of supercontinuum light with the electronic light synthesizer, temporally compressed optical pulse were provided to a hybrid dispersion decreasing HNLF to overcome decoherence in supercontinuum generation associated with optical pulse duration much longer than 0.1 ps and reduced efficiency for pulse energy below 1 nJ. Operating supercontinuum generation with >200 fs, <0.3 nJ pulses involved amplification of the frequency comb and broadened light from the self-phase modulator to optical power levels up to 5 Watts. An optical pulse with duration in the range 0.1 ps to 1 ps was amplified while maintaining a pulse spectral phase profile that was corrected with the dispersion associated with single mode optical fiber. FIG. 17 shows data for the 10 GHz EOM comb following self-phase modulation broadening. Here, an optical spectrum is shown in panel A of FIG. 17, and its intensity autocorrelation is shown in panel B of FIG. 17. The data were acquired after re-amplification with the Yb/Er co-doped fiber amplifier (YEDFA) to 1.4 W average power. A line-by-line filter as the spatial light modulator was used after the YEDFA to adjust dispersion of the system. The phase balance of 10 GHz signals sent to the phase and amplitude modulators of the microwave modulator was adjusted to provide a coarsely flat optical spectrum after amplification. By applying second-order dispersion with the line-by-line filter, the autocorrelation of the pulse was compressed to less than 300 fs, as indicated by the FWHM of the central peak of this signal.

Figure 18:
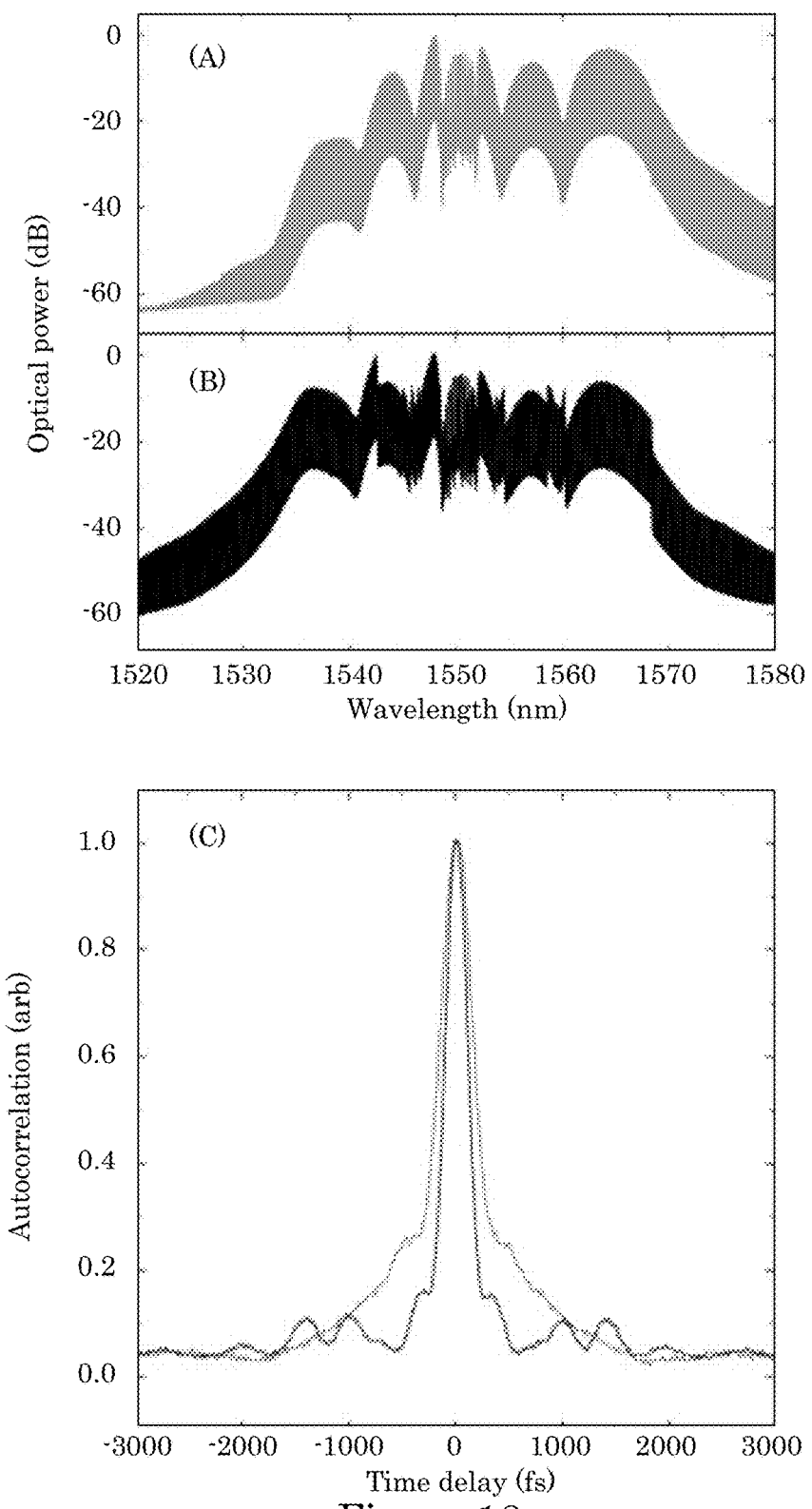
FIG. 18 shows graphs of optical power versus wavelength in panels a and B and a graph of autocorrelation versus time delay in panel C.

FIG. 18 shows a comparison of optical spectrum flattening on the autocorrelation of the amplified pulse. Panel A shows an optical spectrum of the EOM comb after self-phase modulation spectral broadening without flattening, and panel B shows an optical spectrum after flattening the spectrum in 5 nm increments. Panel C shows a comparison of the intensity autocorrelation with (green) and without (black) power flattening. Coarse flattening reduces gain narrowing of the frequency comb spectrum.

Figure 19:
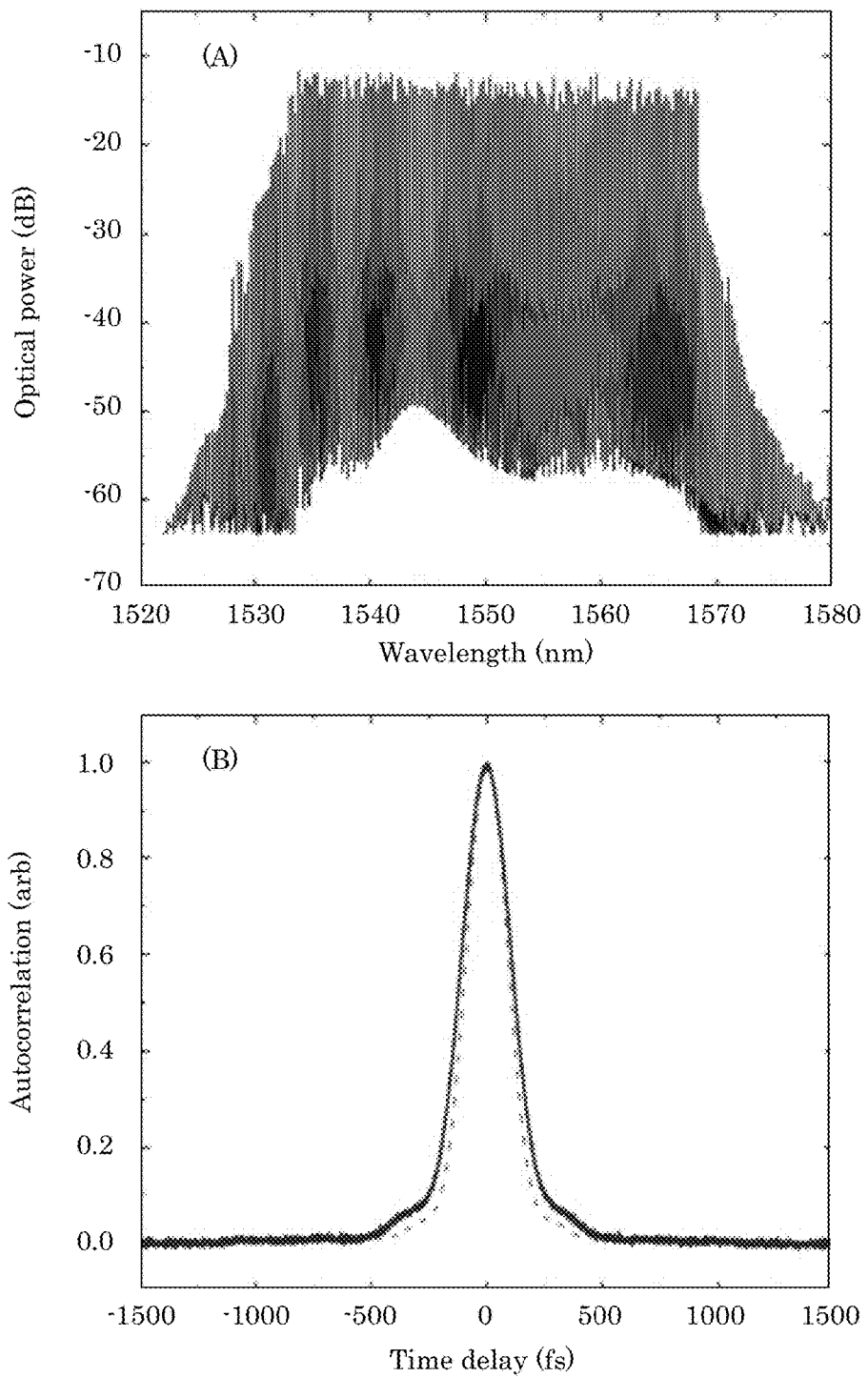
FIG. 19 shows a graph of optical power versus wavelength in panel A and a graph of normalized autocorrelation versus time delay in panel B.

Deterministic compression of the EOM optical pulses after amplification can be accomplished by applying a line-by-line amplitude and phase optimization using an adaptive algorithm. In the procedure, we use feedback from the intensity autocorrelation to optimize the amplitude and phase mask applied at the line-by-line filter. This procedure provided both flattening of the optical spectrum and compression of the pulse autocorrelation to a Fourier-transform limit. FIG. 19 shows results for a 33 GHz EOM comb, and we amplify it to 5 W average power within the second nonlinear spectral broadening stage.

Figure 20:
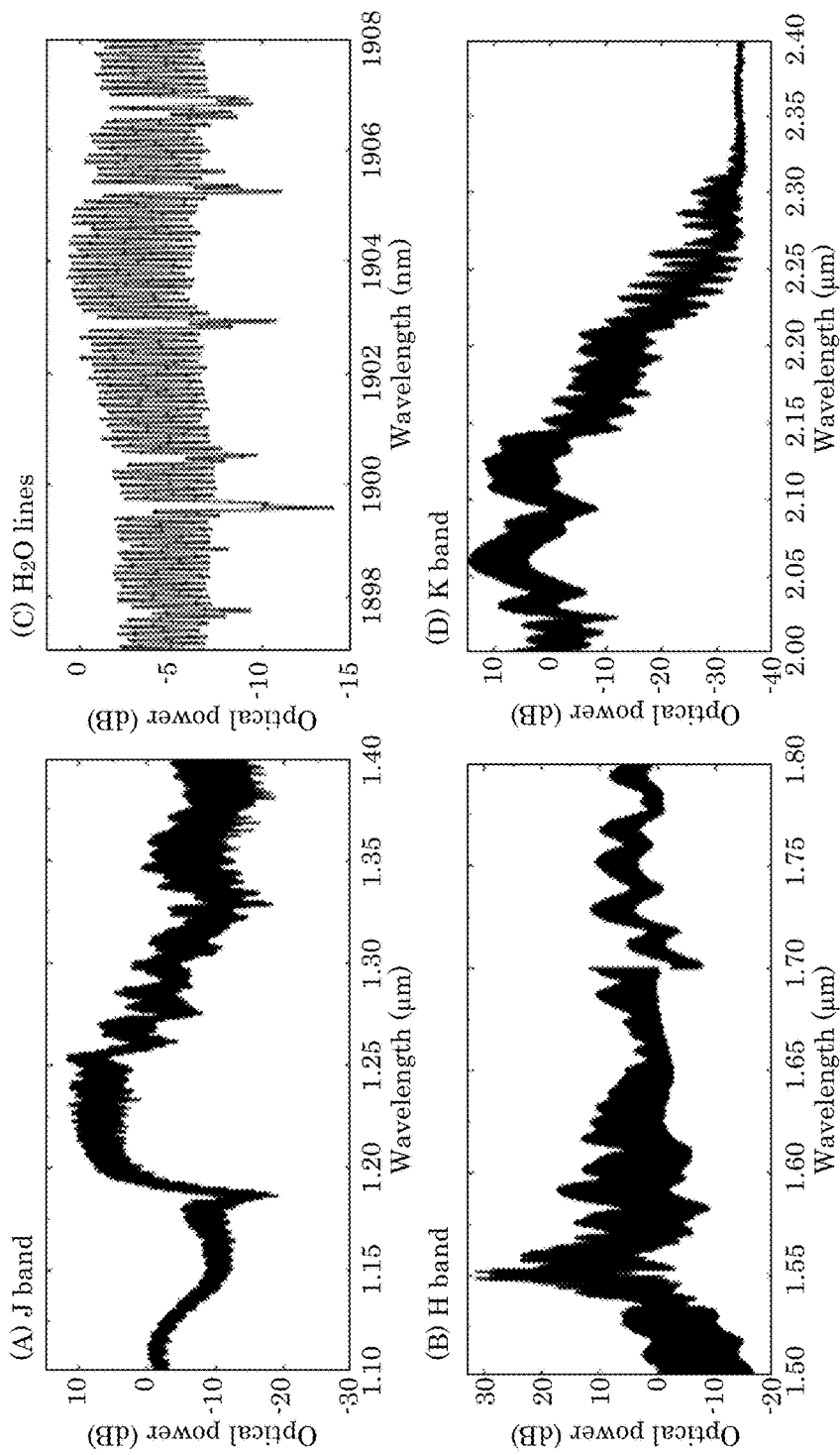
FIG. 20 shows graphs of optical power versus wavelength.

More detailed set of optical spectra for the supercontinuum generated with the 10 GHz comb is shown in FIG. 20. Here, comb modes or resolved directly across the entire octave bandwidth of the spectrum. The resolution of the optical spectrum analyzer varies across the spectrum. High resolution optical heterodyne measurements separately indicate the comb modes feature greater than 20 dB signal-noise ratio in the 1070 nm, 1319 nm, 2140 nm spectral band, and throughout the 1550 nm band. In FIG. 20, the plots are labeled by either the conventional infrared spectroscopy nomenclature or, as in panel C of FIG. 20, to indicate the observation of water absorption features detected near 1900 nm.

Example 2. Phase Noise of the Carrier-Envelope Offset Frequency

The supercontinuum light produced in Example 1 was used for detection of the EOM-comb carrier-offset frequency, which provides a sensitive measure of the oscillator's phase noise. Sensitivity to this phase noise in $f_0$ results from frequency multiplication of $f_{eo}$ to obtain sufficient bandwidth for self-referencing. Here, a comparison of the 10 GHz phase noise as detected in $f_0$ and as predicted from measurements of the 10 GHz source directly in the microwave domain is presented.

Figure 21:
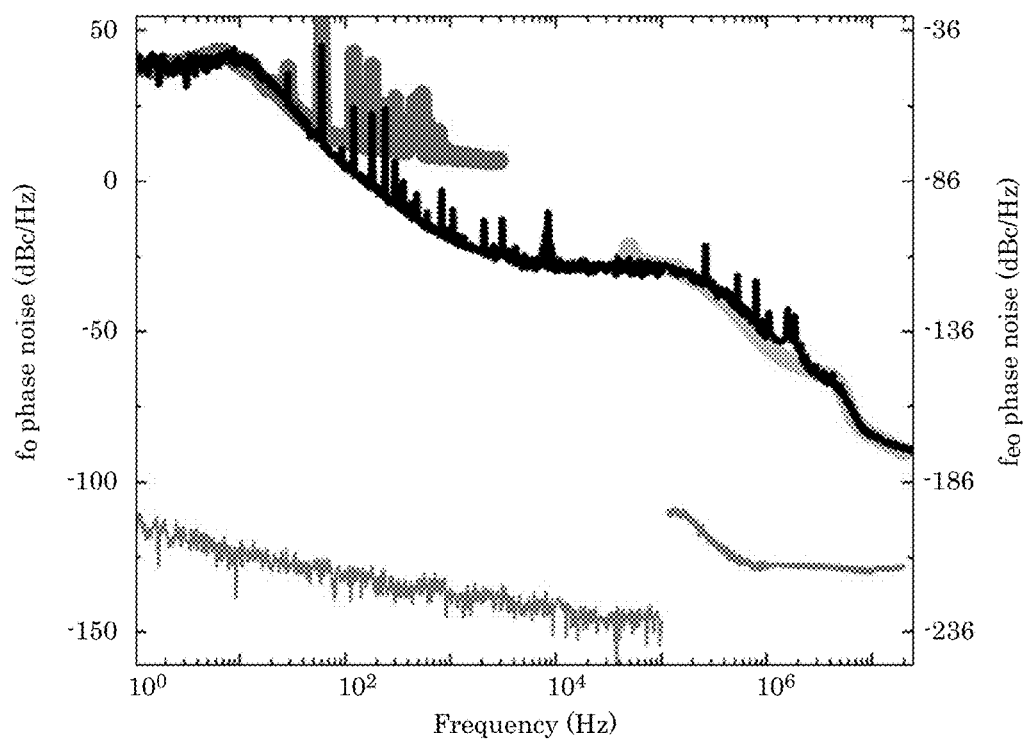
FIG. 21 shows a graph of carrier-envelope offset frequency phase noise versus frequency.

The $f_0$ lineshape is investigated by measuring its phase-noise spectrum for Fourier frequencies from 1 Hz to 20 MHz (see the black trace in FIG. 21). The offset frequency $f_0 = v_p - N\, f_{eo}$ is detected at $f_0 < f_{eo}$ as the frequency difference between the 193 THz CW laser and the multiplied $f_{eo}$. Hence, the phase noise of $f_0$ is the sum of contributions from the CW laser and $f_{eo}$, but the dominant contribution to the phase noise arises from frequency multiplication of the EOM modulation frequency $f_{eo}$ by a factor of 19 340. In FIG. 21, the cyan trace depicts the contribution to the phase noise of $f_0$ of the 10 MHz hydrogen maser, which affects $f_0$ through $f_{eo}$ with a multiplication factor of 1000×19340 (trace adjusted by $(1000\times19340)^2$=+146 dB). The magenta trace is the high-offset phase noise of $f_{eo}$ adjusted by +86 dB and filtered by the 7 MHz FWHM Lorentzian lineshape of the optical-filter cavity. Here the trace is adjusted by +86 dB since we measure this signal at 10 GHz, not 10 MHz. The impact of the filter cavity is minimal in this prediction curve. However, the filter cavity reduces high Fourier frequency noise associated with thermal fluctuations.

Agreement between the measured phase noise of $f_0$ and its known contributions is an indicator of the phase-coherent link between microwave and optical domains provided by the EOM comb. Moreover, recording the phase-noise spectrum of $f_{eo}$ in this way offers a detection limit below −200 dBc/Hz at microwave frequencies. The phase-noise floors of the two analyzers are shown by the gray traces in FIG. 21.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. An electronic light synthesizer to electronically synthesize supercontinuum light, the electronic light synthesizer comprising:
    a microwave modulator that:
        receives a continuous wave light comprising an optical frequency;
        modulates the continuous wave light at a microwave repetition frequency; and
        produces a frequency comb comprising the optical frequency and modulated at the microwave repetition frequency;
    a self-phase modulator in optical communication with the microwave modulator and that:
        receives the frequency comb from the microwave modulator;
        spectrally broadens an optical wavelength range of the frequency comb; and
        produces broadened light comprising the optical frequency and modulated at the microwave repetition frequency;
    an optical filter in optical communication with the self-phase modulator and that:
        receives the broadened light from the self-phase modulator; and
        optically filters electronic noise in the broadened light;
    a supercontinuum generator in optical communication with the optical filter and that:
        receives the broadened light from the optical filter;
        spectrally broadens the optical wavelength range of the broadened light; and
        produces supercontinuum light comprising the optical frequency and modulated at the microwave repetition frequency; and
    a self-referencing interferometer in optical communication with the supercontinuum generator and that:
        receives the supercontinuum light from the supercontinuum generator; and
        produces interference light comprising a primary optical frequency and a doubled optical frequency form the supercontinuum light.

2. The electronic light synthesizer of claim 1, further comprising an optical detector in optical communication with the self-referencing interferometer and that:
    receives the interference light from the self-referencing interferometer; and
    produces a carrier-envelope offset frequency from an optical heterodyne beat obtained from the primary optical frequency and the doubled optical frequency.

3. The electronic light synthesizer of claim 2, further comprising a continuous wave light source in optical communication with the microwave modulator and that provides the continuous wave light to the microwave modulator.

4. The electronic light synthesizer of claim 3, further comprising a reference cavity in optical communication with the continuous wave light source and in electrical communication with the optical detector and that:
receives the carrier-envelope offset frequency from the optical detector; and
controls the continuous wave light source,
wherein the optical frequency is stabilized by the continuous wave light source based on the carrier-envelope offset frequency at the reference cavity.

5. The electronic light synthesizer of claim 1, further comprising a microwave frequency source in communication with the microwave modulator and that provides the microwave repetition frequency to the microwave modulator.

6. The electronic light synthesizer of claim 5, wherein the microwave modulator comprises:
an intensity modulator; and
a phase modulator.

7. The electronic light synthesizer of claim 6, wherein the microwave modulator comprises a phase shifter in communication with the microwave frequency source and the phase modulator and that:
receives the microwave repetition frequency from the microwave frequency source; and
phase shifts microwave repetition frequency at the phase modulator relative to intensity modulator.

8. The electronic light synthesizer of claim 1, further comprising a spatial light modulator optically interposed between the self-phase modulator and the supercontinuum generator.

9. The electronic light synthesizer of claim 1, wherein the self-phase modulator comprises:
an optical amplifier; and
a highly-nonlinear fiber in optical communication with the optical amplifier.

10. The electronic light synthesizer of claim 9, wherein the self-phase modulator further comprises a dispersion compensator in optical communication with the optical amplifier.

11. The electronic light synthesizer of claim 9, wherein the self-phase modulator further comprises a dispersion compensator in communication with the highly nonlinear fiber.

12. The electronic light synthesizer of claim 9, wherein the supercontinuum generator further comprises a gate in optical communication with the optical amplifier, wherein the gate changes the microwave repetition frequency of the broadened light prior to production of the supercontinuum light.

13. The electronic light synthesizer of claim 12, wherein the gate comprises a waveguide lithium-niobate intensity modulator.

14. The electronic light synthesizer of claim 1, wherein the self-phase modulator comprises:
an optical amplifier; and
a nonlinear photonic-chip waveguide that comprises silicon, silicon nitride, silica, aluminum-gallium-arsenide, or aluminum nitride.

15. The electronic synthesizer of claim 1, wherein the frequency comb produced by the microwave modulator is communicated from the microwave modulator to an optical filter cavity, an optical amplifier, a nonlinear fiber for self-phase modulation, an optical fiber for dispersion compensation, and a supercontinuum generator.

16. The electronic light synthesizer of claim 1, wherein the supercontinuum generator comprises:
an optical amplifier; and
a highly-nonlinear fiber in optical communication with the optical amplifier.

17. The electronic light synthesizer of claim 1, wherein the supercontinuum generator comprises:
an optical amplifier; and
a nonlinear photonic-chip waveguide composed of silicon, silicon nitride, silica, aluminum-gallium-arsenide, or aluminum nitride.

18. The electronic light synthesizer of claim 1, wherein the self-referencing interferometer comprises a second harmonic generator that produces the doubled optical frequency.

19. The electronic light synthesizer of claim 1, wherein the optical filter comprises a Fabry-Perot cavity or a whispering gallery mode cavity.

20. The electronic light synthesizer of claim 1, wherein a wavelength of the supercontinuum light is from 1050 nm to 2300 nm.

21. The electronic light synthesizer of claim 1, wherein a frequency of the microwave repetition frequency is from 2.5 GHz to 33 GHz.

22. The electronic light synthesizer of claim 1, wherein a wavelength of the continuous wave light is from 1530 nm to 1570 nm.

23. The electronic light synthesizer of claim 1, wherein a wavelength of the broadened light from self-phase modulation is from 1500 nm to 1600 nm.

* * * * *